United States Patent [19]
Dalziel

[11] Patent Number: 5,359,476
[45] Date of Patent: Oct. 25, 1994

[54] EXPRESS PORT FOR CARTRIDGE CAROUSEL SYSTEM

[75] Inventor: Warren L. Dalziel, Monte Sereno, Calif.

[73] Assignee: Storage Technology Corporation, Louisville, Colo.

[21] Appl. No.: 982,940

[22] Filed: Nov. 30, 1992

[51] Int. Cl.$^5$ ............................................. G11B 15/68
[52] U.S. Cl. ................................................... 360/92
[58] Field of Search ........................................ 360/92

[56] References Cited

U.S. PATENT DOCUMENTS

| | | | |
|---|---|---|---|
| 3,953,890 | 4/1976 | Wanek et al. | 360/85 |
| 4,271,440 | 6/1981 | Jenkins et al. | 360/92 |
| 4,481,862 | 11/1984 | Wiethoff et al. | 89/46 |
| 4,586,797 | 5/1986 | Sherer | 353/109 |
| 4,779,151 | 10/1988 | Lind et al. | 360/92 |
| 4,802,587 | 2/1989 | Armijo et al. | 206/44 |
| 4,846,619 | 7/1989 | Crabtree et al. | 414/273 |
| 4,934,891 | 6/1990 | Hawkswell | 414/223 |
| 4,991,041 | 2/1991 | Grant | 360/92 |
| 5,019,927 | 5/1991 | Simone | 360/92 |
| 5,021,901 | 6/1991 | Mondocea et al. | 360/92 |
| 5,127,715 | 7/1992 | Doyle et al. | 312/9.4 |
| 5,167,922 | 12/1992 | Long | 422/58 |
| 5,236,258 | 8/1993 | Bunch | 360/92 X |

Primary Examiner—John H. Wolff
Attorney, Agent, or Firm—Pennie & Edmonds

[57] ABSTRACT

A data library system is disclosed, having a lightweight carousel featuring a system of guide blocks and springs to hold tape cartridges securely but permit their removal and replacement by bidirectional manipulators. The manipulators carry hinged hooks that can be used to push cartridges radially outward, or upon flexing of the hinges, expand to grip the cartridge for pulling radially inward. A rotating express port is disclosed for addition or removal of single cartridges without the need to dismount the carousel from the library system. The express port is designed to prevent cartridges from being inserted in the wrong orientation, and a reflective optical sensor is used to confirm that each cartridge in the carousel is properly placed. Optical sensors also verify proper rotation of the carousel, index the carousel, and detect the presence of cartridges in the tape drives and express port. The carousel carries drive pins which seat in tapered holes in an index plate, and is driven by a zero-backlash belt.

7 Claims, 23 Drawing Sheets

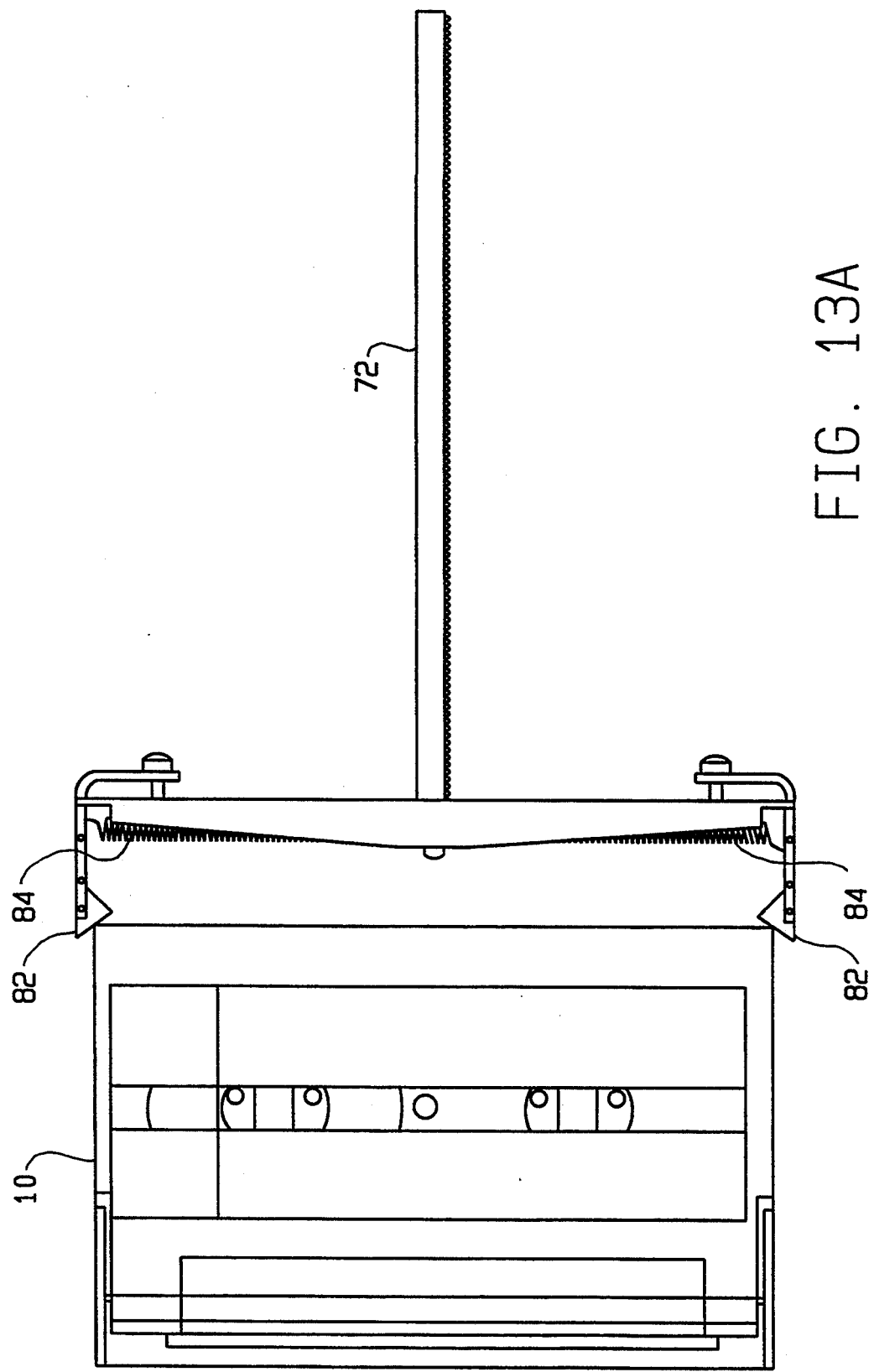

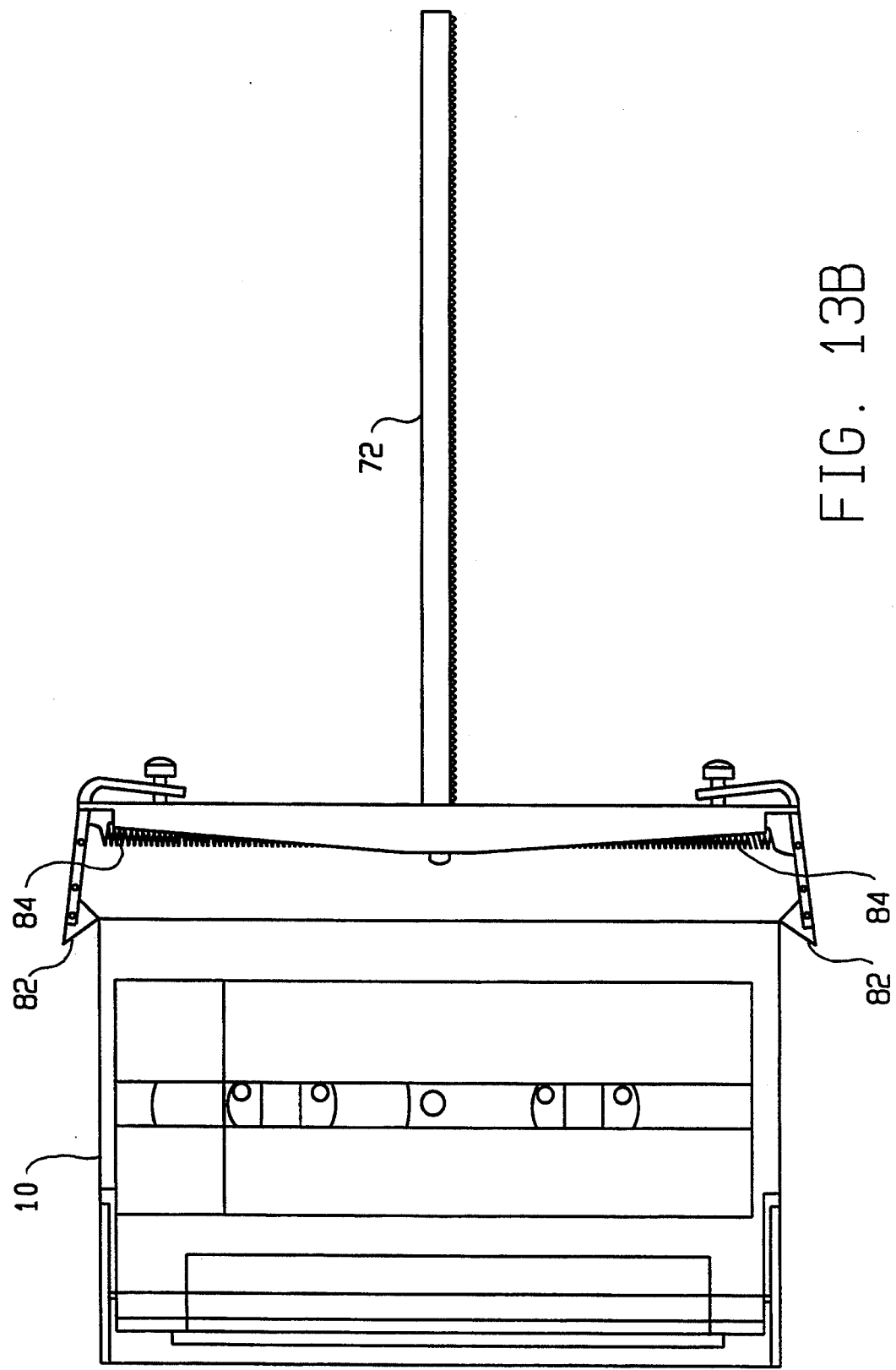

EXPRESS PORT FOR CARTRIDGE CAROUSEL SYSTEM

BACKGROUND OF THE INVENTION

This invention relates to the field of automated data storage systems, and in particular to carousel data library systems in which many discrete media elements, such as tape cartridges, are stored and manipulated for access to the information recorded therein.

Tape cartridge libraries are in demand as a means of providing relatively rapid and automatic access to a large quantity of information at low cost, while also providing conveniently compact storage. One example of a prior art cartridge library is the IGM-ATL 2300 automated tape library, sold by IGM Data AutoLoader Division, based in Bellingham, Wash. That system used a carousel to carry up to fifty-four 8 mm tape cartridges, for automatic loading into tape drives, with access to a total storage volume of up to 270 gigabytes of data. Another example prior art system is the STL-8000 8 mm automated tape library, offered by Spectra Logic of Boulder, Colo., using a carousel with space for forty cartridges.

Such prior art systems were not without disadvantages. For example, the weight of the carousel was often excessive for easy handling by human operators. In addition, the schemes employed for retaining cartridges within the carousel sometimes proved unsatisfactory in use. In the case of the ATL-2300, for instance, the carousel had one configuration for transport and handling, and another for use. In the "secure" mode for handling, each cartridge was constrained from radial motion out of the carousel by a metal peg protruding downward from the carousel top at the outer edge, aligned roughly at the middle of the cartridge chamber. When installed in the library, the carousel was manually shifted to the operating configuration by rotation of a knob, which angularly displaced the set of fifty-four pegs so that they were no longer aligned with the chambers, thus permitting the cartridges to move in and out.

If the carousel were removed from the library without first securing the cartridges, the cartridges could slide and fall out of the carousel unintentionally. Furthermore, in operating configuration within the library, the cartridges were not constrained from migrating outward as a result of vibration and frequent acceleration of the carousel, bringing a risk of jamming of the mechanism. The manually operated peg system also added undesired weight to the carousel; the weight of the tape cartridges is significant in itself, and additional structural weight is undesirable.

The configuration of the library also yielded inefficiencies. For example, the ATL-2300 cartridges were carried radially in the carousel, and need to be pushed into and out of the carousel for use by tape drives placed outside the carousel. Motorized pushing shafts were placed near the axis of the carousel to push the cartridges outward toward the tape drives, but separate systems, located outside the carousel by the tape drives, were needed to push them back in again. Additional complexity and costs arise from the extra motors, shafts, and so forth needed for the separate pushing operations.

In the case of the STL-8000, the tape drives were placed entirely within the inner diameter of the carousel. This required placement of each cartridge at an angle to the carousel, rather than radially, and restricted the number of cartridges that could be carried while still fitting within the form factor required for standard cabinet racks. Reduced storage capacity was a result. In addition, placement of the tape drives in the interior of the carousel increases the difficulty of providing cooling air to the drives.

Consequently, a need exists for a carousel library system having a lightweight carousel that has a simple and automatic scheme for retaining cartridges securely during transport and handling, and retaining them in place during motion of the carousel, but permitting easy removal by the library mechanism when desired. An ideal system would also have provisions for moving cartridges back and forth from tape drives to the carousel that is simple and robust while employing fewer motors and related hardware. It is also highly desirable to minimize the chance that cartridges will be improperly loaded into the carousel, and to provide a convenient way for individual cartridges to be added to or withdrawn from the carousel without removing the carousel from the library.

Achieving each of these desired attributes is complicated by the choice of media. For standard 8 mm data cartridges, the design of the cartridge case offers few features to be exploited for easy handling or for ensuring proper orientation.

SUMMARY OF THE INVENTION

In accordance with the preferred embodiment of the present invention, a data cartridge library system features a lightweight carousel that retains cartridges through the use of simple wire springs which grip small depressions in the cartridges. Each such spring is sufficiently powerful to retain the cartridge during handling, but may be overcome by the manipulating apparatus within the library. The springs are mounted on guide blocks, fitted to the top and bottom interior surfaces of the carousel, which create chambers for the cartridges, while adding minimal weight. Tape drives are placed outside the periphery of the carousel, where the cartridges may be delivered to them by radial motion.

The cartridges may be pushed outward from the carousel to a tape drive, and drawn back into the carousel, by bidirectional manipulators operating from a position within the diameter of the carousel. The manipulators carry hinged hooks which abut the cartridge during a pushing operation, but can be forced over the edges of the cartridge to drop into the depressions in the cartridge sides to grip the cartridge for pulling it in the opposite direction.

A rotating express port permits individual cartridges to be removed or installed without removal of the carousel from the library. When rotated to face the carousel, it can be loaded or unloaded in the same manner as a tape drive, using a similar bidirectional manipulator. Rotation of the express port opens a door to the exterior of the system, permitting a cartridge to be added or withdrawn manually. A sprung roller, cooperating with the tapered front face of a standard data cartridge, permits loading in the proper orientation, but prevents improper loading.

In addition, optical sensing is used to confirm that each cartridge in the carousel has been properly loaded. Optical sensors also are used to verify that a cartridge is in a tape drive or in the express port, to index a carousel, and to confirm proper rotation of the carousel.

The resulting system offers high capacity storage with a maximal number of cartridges carried in a lightweight carousel, while still fitting into a standard rack. The carousel holds the cartridges through rough manual handling, but requires no reconfiguration for use in the library. The bidirectional manipulators are simple and require only one motor each, and the express port offers convenience for the user, while protecting against operator errors in cartridge orientation.

BRIEF DESCRIPTION OF THE DRAWINGS

FIGS. 13A, 13B, and 13C are side views of a bidirectional manipulator respectively in pushing, transitional, and pulling contact with a cartridge.

DETAILED DESCRIPTION OF THE PREFERRED EMBODIMENT

Figure 1:
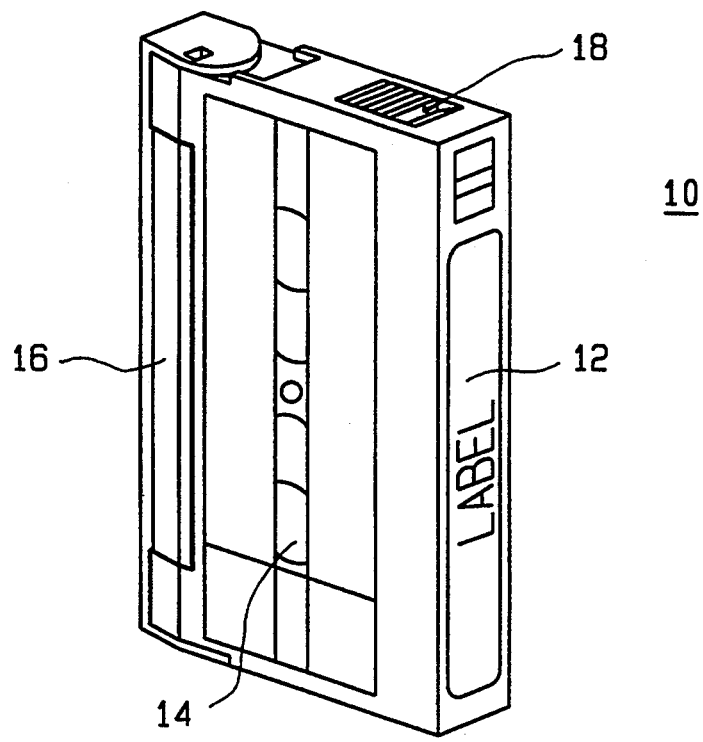
FIG. 1 is a perspective view of an 8 mm tape data cartridge.

The preferred embodiment of the present invention will be described in the context of a library system for use with standard 8 mm tape data cartridges, although those skilled in the art will recognize that the disclosed structures are readily adaptable for broader application. Note that whenever the same reference numeral is repeated with respect to different figures, it refers to the corresponding structure in each such figure.

Salient features of a standard 8 mm data cartridge can be appreciated by referring to FIG. 1, in which a data cartridge 10 is depicted. For convenience in describing the orientation of cartridge 10, the surface bearing label 12 will be called the back, while the surface bearing window 14 will be called the top. A hinged cover 16 protects the tape path at the front of the cartridge. Note that cover 16 is tapered toward the top of cartridge 10. A depression 18 is provided on the right side near the back. A similar depression is symmetrically placed on the left side, but is not visible in this view. The bottom surface of the cartridge is also hidden in this figure; it includes openings over the hubs of the tape reels carried inside cartridge 10. Item 20 on the back surface is a write-protect tab which may be positioned to permit or prevent recording on the tape. As depicted, cartridge 10 is standing on its left side.

Figure 2:
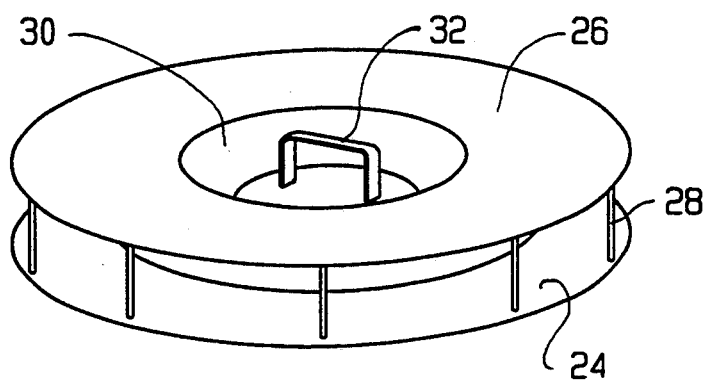
FIG. 2 is a perspective view of a carousel.
Figure 3A:
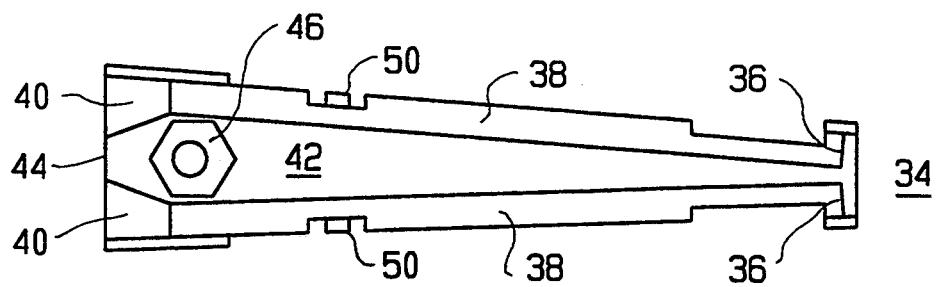
FIGS. 3A, 3B, and 3C are respectively top, side, and end views of a guide block.

The general configuration of a carousel 22 for carrying multiple cartridges 10 is shown in FIG. 2. Cartridges 10 will be carried between lower ring 24 and top 26, oriented with the left side of each cartridge toward ring 24 and the front of each cartridge facing outward from the center of the ring. A set of posts 28 connects ring 24 with top 26 and fixes a uniform spacing between them adequate to hold the cartridges. Around the center of top 26 is a recessed area 30 in which a handle 32 is placed to permit easy insertion and removal of the carousel from a library system. In the preferred embodiment, carousel 22 includes additional structure to position and retain the cartridges. The details of the that structure will be explained by referring to FIGS. 3A-C.

A guide block 34 is shaped to accommodate cartridges 10. In the top view of FIG. 3A, cartridge stops 36 are seen at the back end of cartridge supporting surfaces 38. At the front end of surfaces 38 are ramps 40 to assist in aligning a cartridge as it is placed into the carousel. A central spine 42 includes tapered end 44 for the same purpose. Also visible in the spine is a hole 46, which serves a dual purpose. It may be shaped as a hexagonal cavity with a round aperture in the center, suitable for retaining a hex nut for attachment of block 34 to the carousel. It may also serve as a socket for one of posts 28.

Figure 3B:
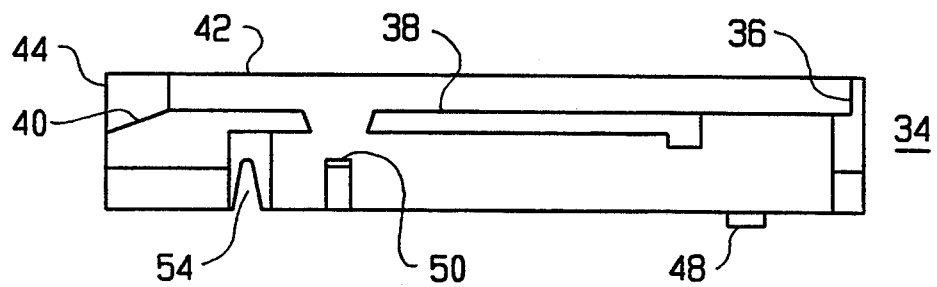
Figure 3C:
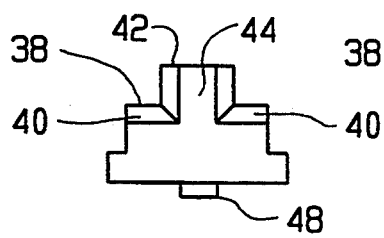

As seen in the side view of FIG. 3B, an alignment pin 48 is also provided for positioning block 34 on the carousel. Block 34 also carries wedge 50, stop 52, and notch 54; the functions of these features will be explained in due course. A front end view in FIG. 3C shows pin 48 as well as ramps 40, tapered end 44 of spine 42, and surfaces 38.

Figure 4:
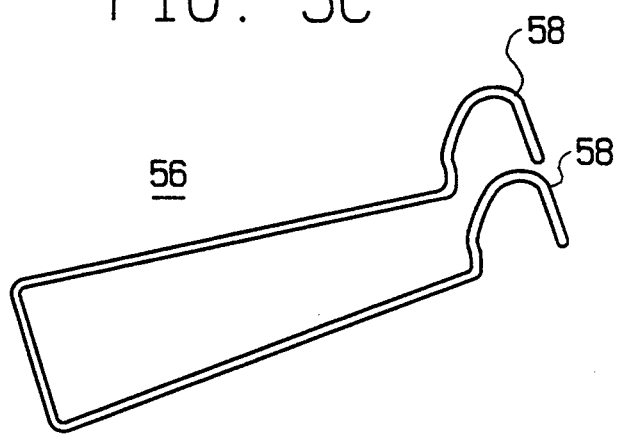
FIG. 4 is a perspective view of a wire spring.
Figure 5A:
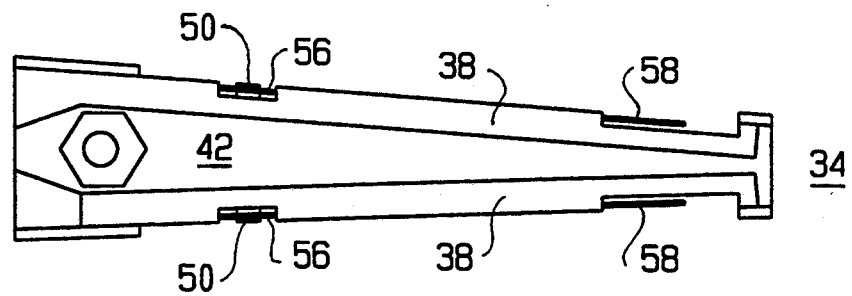
FIGS. 5A and 5B are respectively top and side views of a guide block fitted with a spring.
Figure 5B:
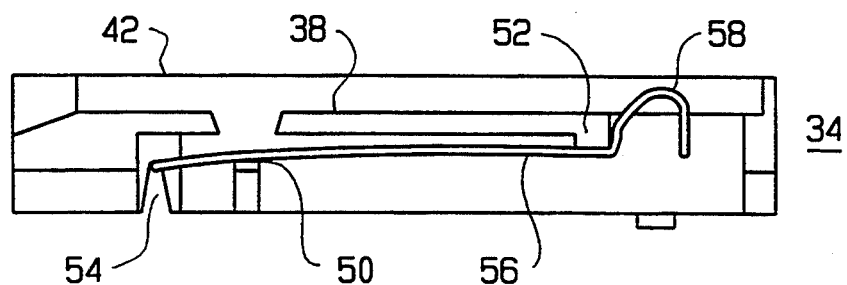

FIG. 4 shows a wire spring 56, having retaining ends 58. In the preferred embodiment, half of the blocks 34 will be fitted with springs 56. Once fitted, the configuration will be as shown in FIGS. 5A-B. Note that one end of spring 56 fits within notch 54. The sides of the spring then pass over wedges 50 and under stops 52, causing a curvature to preload the spring in the vertical plane. Retaining ends 58 are shown protruding above surfaces 38 where those surfaces are narrowed toward spine 42.

A set of blocks 34 is mounted on carousel 22 to form chambers for cartridges 10. Pairs of adjacent blocks 34 cooperate to hold a cartridge between them. The placement of blocks 34 can be understood by referring to FIG. 6. There, a portion of ring 24 is shown, with three blocks 34 attached. A dotted outline 60 indicates the perimeter of a cartridge 10 as it would be placed between two of the blocks 34. Since this is a top view, it will be understood that the cartridge is placed on its left side with its back toward the center of ring 24 and against stops 36, and the tapered front of cartridge toward the outside of ring 24. In the preferred embodiment, the blocks are positioned radially with respect to the center of ring 24. As can be seen, the cartridges 10 thus are also radially positioned.

Figure 6:
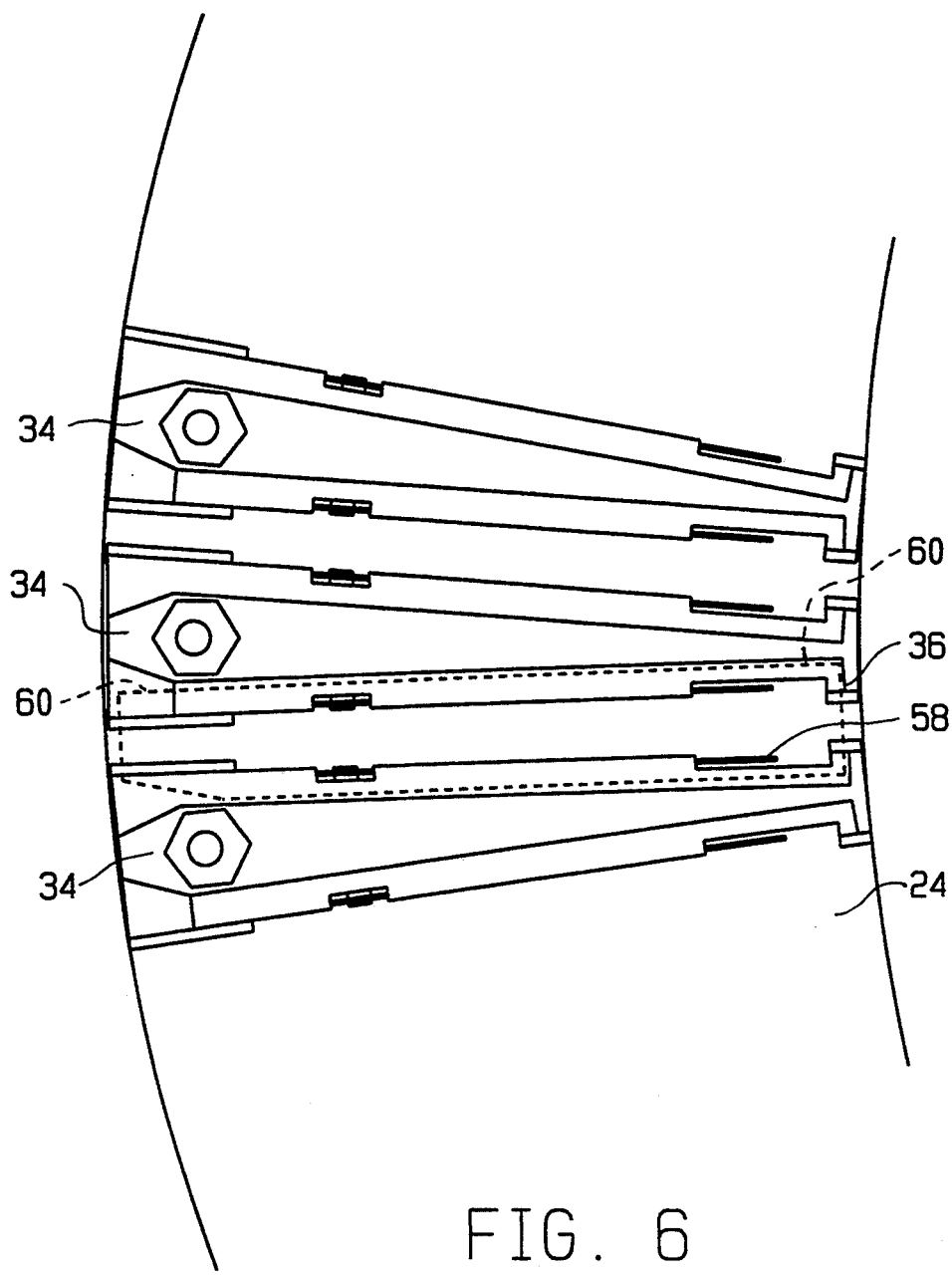
FIG. 6 is a top view of a portion of a carousel lower ring fitted with guide blocks.

Note that the outer two of the three blocks 34 of FIG. 6 are each fitted with a spring, but that the center block is not so fitted. Normally, blocks with and without springs are alternated around the ring 24. In the preferred embodiment, fifty-four blocks will be used on the ring, twenty-seven of them having springs, creating chambers for fifty-four cartridges.

The arrangement of blocks shown in FIG. 6 is duplicated, with the exception of spring placement, on the lower surface of top 26 of carousel 22, to accommodate the right side of each cartridge. An additional fifty-four blocks are inverted and attached to the underside of top 26 to align with the blocks below on ring 24. In the preferred embodiment, however, the location of each of the spring-fitted blocks on the top is shifted by one position with respect to the blocks on the lower ring. Thus, if a particular block on the lower ring carries a spring, the block immediately above it on the top 26 will not have a spring.

To better understand the reason for this orientation, note that in FIG. 6 the spring retaining end 58 within outline 60 is in a position to interact with the depression 18 that would be found on the left side of the cartridge represented by the outline. Furthermore, the spring retaining end 58 would rise into the end of that depression 18 closest to the cartridge top surface (that is, toward the bottom of the Figure). Placement of the springs on the blocks attached to the carousel top will present a downward extending spring retaining end toward the depression in the right side of cartridge 10 at the end of the depression closest to the cartridge bottom (that is, toward the top of the Figure). Each cartridge will then be in contact with two retaining ends 58, one on the cartridge left side and one on the cartridge right side, at diagonally opposite ends of the depressions 18.

Figure 7:
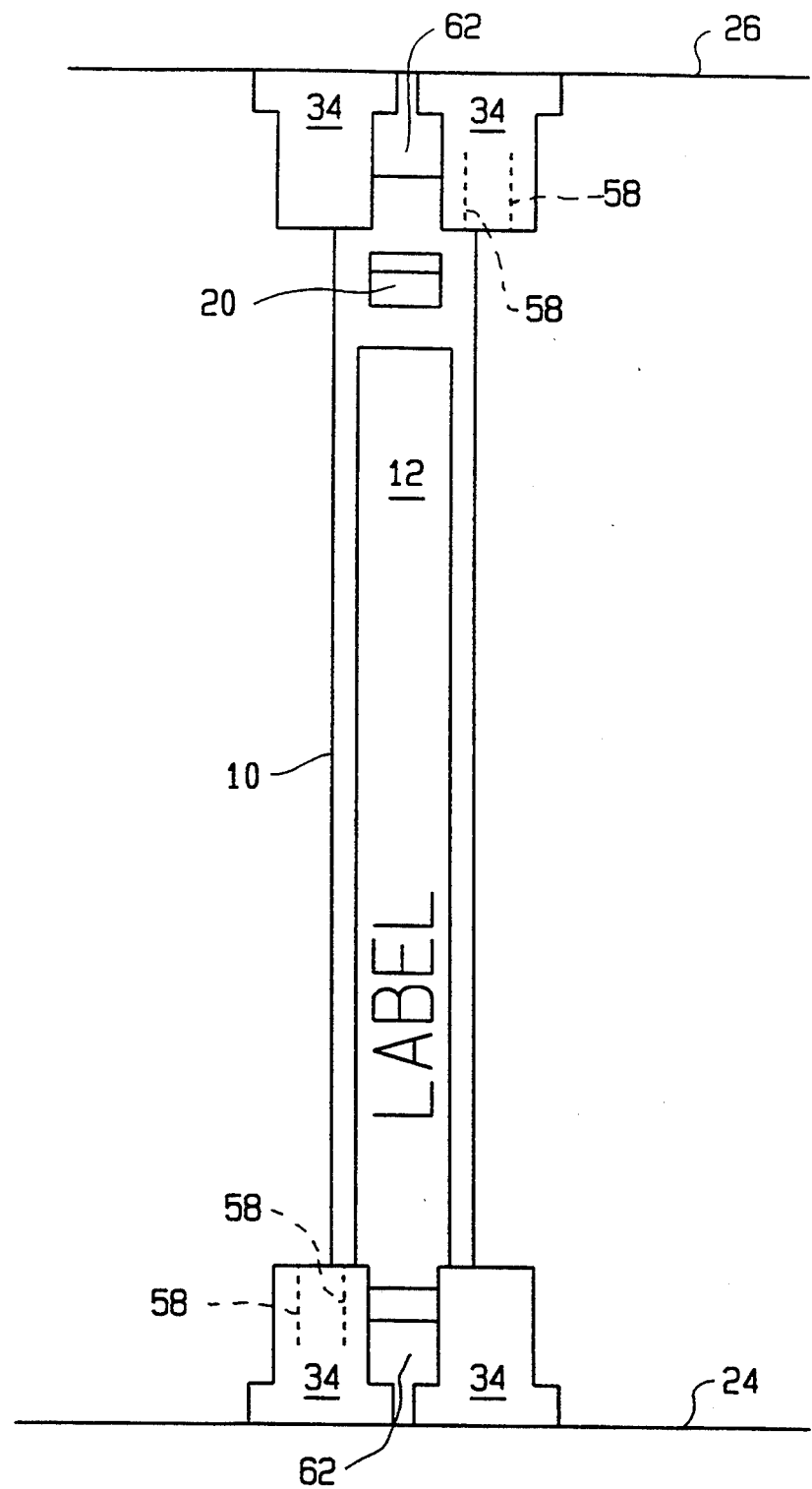
FIG. 7 is a view from inside a carousel showing a cartridge.

Each cartridge 10 will thus be held in a chamber created by four guide blocks, as shown in FIG. 7. In that view, looking radially outward from a point near recessed area 30 close to the center of carousel 22, the inner ends of four blocks 34 are seen, along with label 12 and write-protect tab 20 of cartridge 10. Two blocks 34 are attached to top 26 and two are attached to ring 24. Dotted lines have been placed to approximate the position of spring retaining ends 58, which would otherwise not be visible in this view, but which provide the diagonally opposite contact described above.

Figure 8:
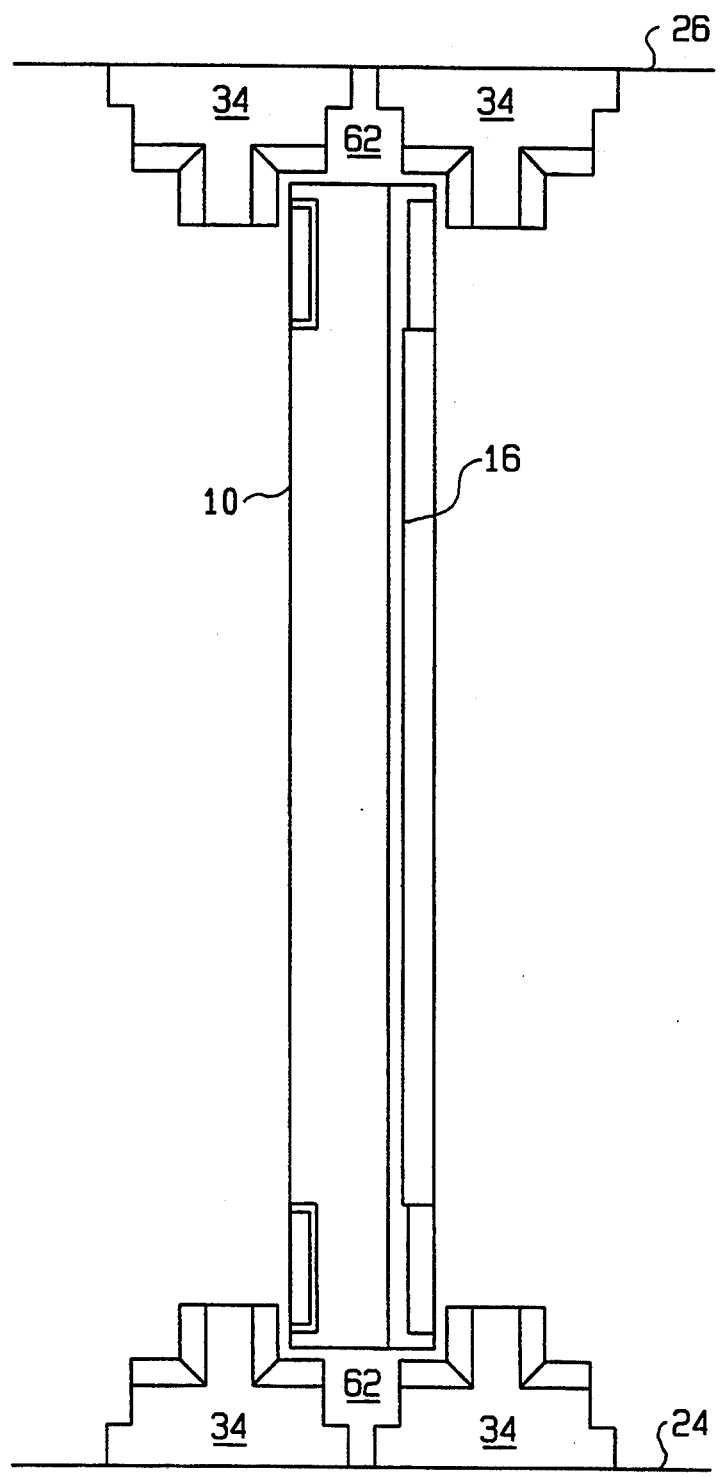
FIG. 8 is a view from outside a carousel showing a cartridge.

A view in the opposite direction is provided in FIG. 8, depicting the same portion of the carousel as in FIG. 7, but looking radially inward toward the center of carousel 22 from a position outside the carousel. The front face cover 16 of cartridge 10 is visible, with the tapering of that face toward the right of the Figure. Neighboring blocks form chambers for additional cartridges, not shown. Note that in both FIG. 7 and FIG. 8, channels 62 can be seen between blocks 34 and above and below cartridge 10, which permit a manipulator to pass through radially for loading and unloading of the carousel.

Once cartridges are loaded, spring 56, through the pressure of retaining ends 58, keeps the cartridges secure in the carousel. In practice, it has been found that cartridges will remain securely in place not only while the carousel is subjected to rotational motion within library system, but also while the carousel is removed from the system during handling and transporting by human operators of the equipment. It has been estimated that the cartridges will be retained through 2 g's of acceleration.

Figure 9A:
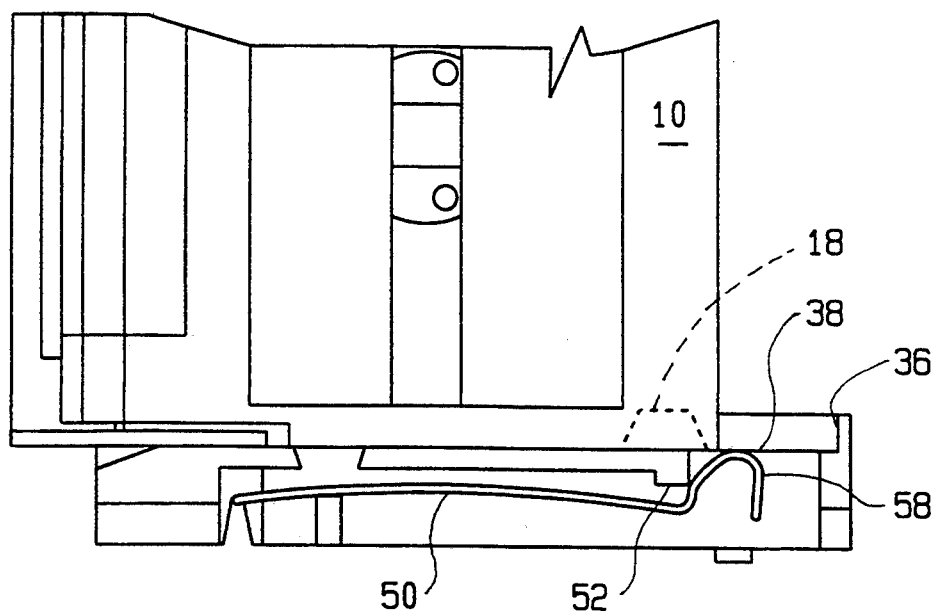
FIGS. 9A and 9B are side views of a cartridge, guide block, and spring, showing successive positions of a cartridge.

While providing security, the retaining ends 58 are also designed to avoid interference with loading and unloading of the carousel. This feature can be understood by referring in sequence to FIGS. 9A and 9B. In FIG. 9A, a cartridge 10 is being radially inserted into carousel 22 from the outside. For clarity of presentation, only a portion cartridge 10 and a single spring-fitted block 34 are shown. The cartridge 10 is sliding from left to right in the Figure, supported on surface 38. The corner of cartridge 10 has forced retaining end 58 downward from the position depicted in FIG. 5B. Spring 50 has been deflected so that it no longer contacts stop 52, but is flexed over the fulcrum provided by wedge 50. The position of depression 18 in the left side of the cartridge is indicated by a dotted line.

Figure 9B:
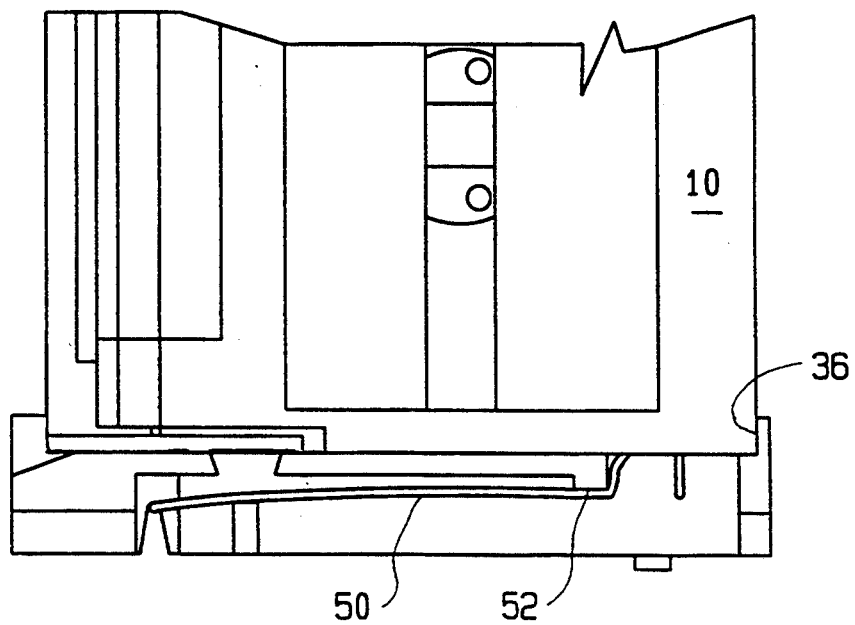

With the spring so deflected, the cartridge can slide unhindered toward stop 36. As the cartridge 10 reaches stop 36, as shown in FIG. 9B, retaining end 58 slips upward into depression 18 to hold the cartridge securely in position. Although not depicted, a corresponding spring action will occur at the diagonally opposite block attached to the top of the carousel.

When removal of a cartridge is desired, the spring force may be overcome by pushing outward on the cartridge. In that case, the action will be represented by referring first to FIG. 9B, and then to FIG. 9A, and assuming motion of the cartridge in the opposite direction from that discussed above.

Figure 10:
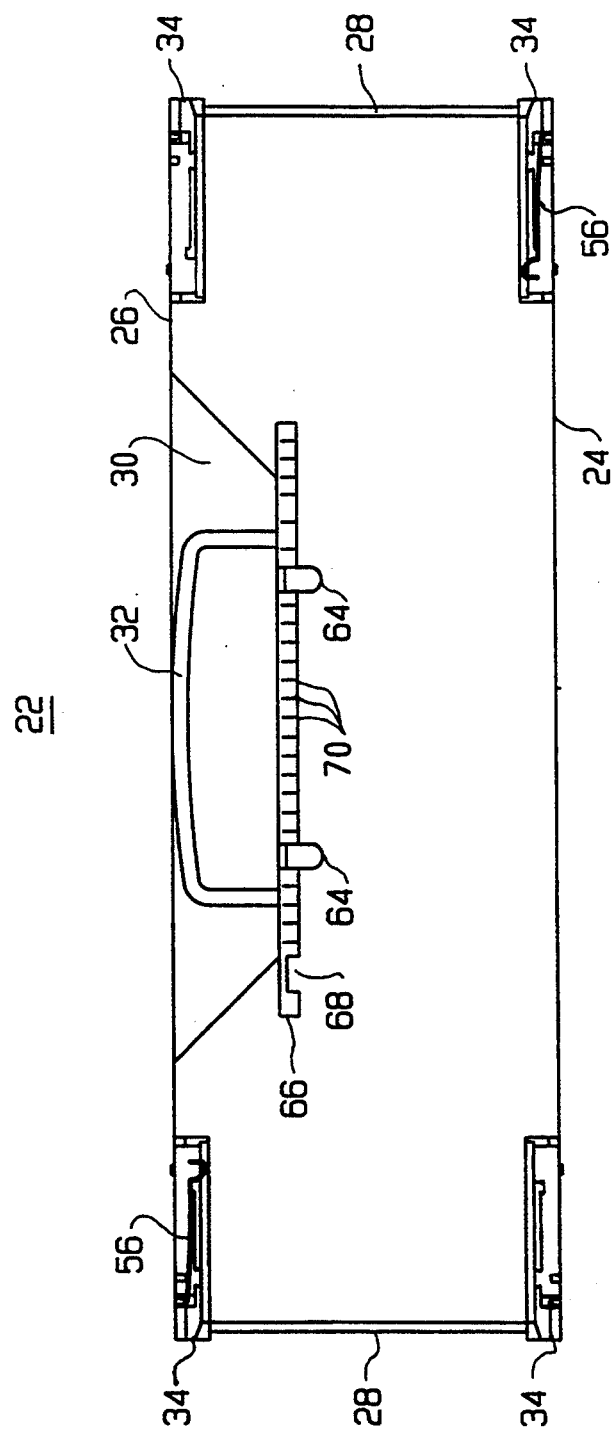
FIG. 10 is a cross-section view of a carousel.

The construction of a complete carousel is represented in the cross-section view of FIG. 10. Ring 24 and top 26 each carry blocks 34, half of which are fitted with springs 56. Posts 28 are used to connect the ring and the top. In the preferred embodiment, it has been found that placement of a post in every sixth block provides adequate rigidity without unduly increasing the weight of the carousel.

Handle 32 lies within recessed area 30. Extending below that recessed area are drive pins 64. In the preferred embodiment, four such drive pins are used. These pins serve to establish the center of rotation of the carousel, to provide alignment of the carousel, and to transmit driving torque.

A shutter plate 66 protrudes below recessed area 30. This plate carries a rim intended to interact with an optical sensing device. For example, a large notch 68 may be provided to permit sensing of an initial or indexed position for the carousel. As the edge of the notch passes an optical sensor, the rotational position of the carousel can be determined. In addition, evenly spaced slits 70 may also be provided. By using an optical sensor to count passage of such slits, the library system can verify that the actual angle of rotation of the carousel matches that which was desired, to permit detection of drive system failures.

The guide blocks 34 may be constructed of teflon fiber impregnated polycarbonate. It has been found that such material provides good frictional behavior with typical cartridges. The top and ring may be thin formed aluminum. The resulting structure is so light that the entire carousel weighs only about ten pounds when fully loaded with fifty-four cartridges.

Figure 11:
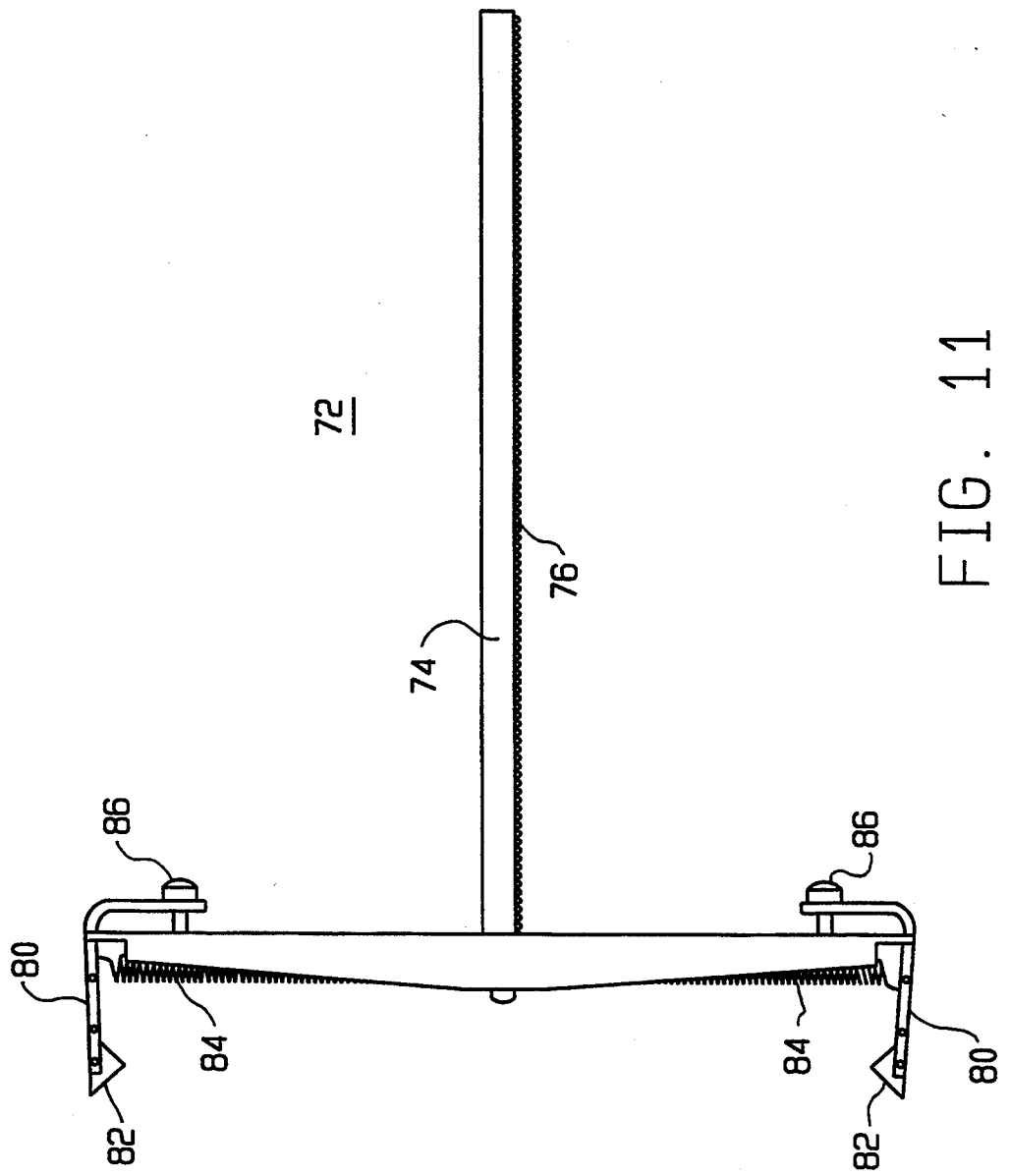
FIG. 11 is a side view of a cartridge manipulator.

A bidirectional cartridge manipulator 72 suitable for use with carousel 22 is shown in FIG. 11. A shaft 74, carrying gear teeth rack 76, is attached to a cross-member 78. At each end of the cross-member is a hinge 80, which carries a triangular cross-section hook 82. Hinges 80 are spring biased toward each other by springs 84. Screws 86 provide adjustable stops for the motion of the hinges 80.

Figure 12:
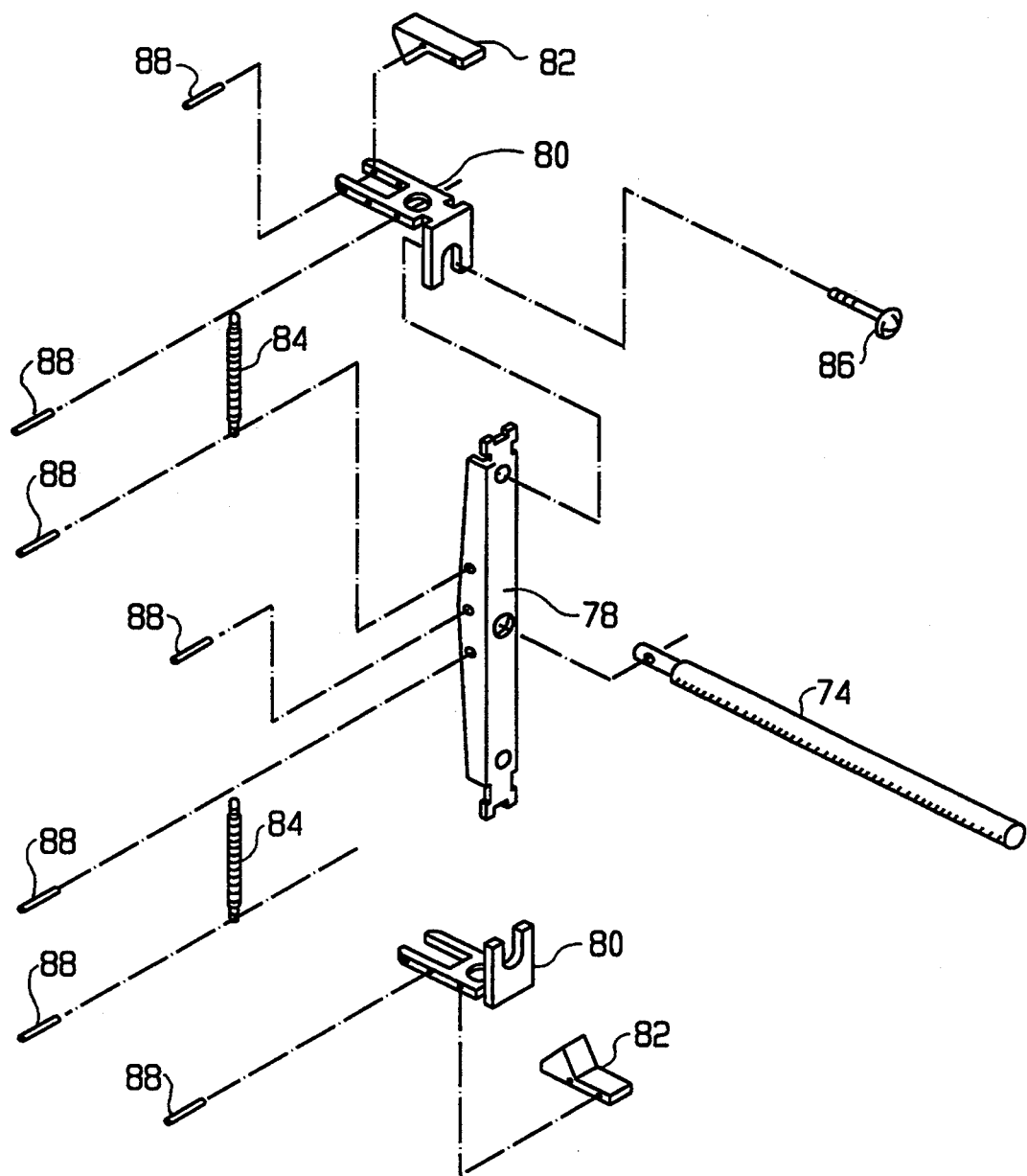
FIG. 12 is an exploded view of the construction of a cartridge manipulator

Construction of manipulator 72 in the preferred embodiment is further illustrated in FIG. 12. Pins 88 are used to fix the components together. Cross-member 78, shaft 74, and hinges 80 are preferably metal, but hooks 82 are formed of plastic.

Figure 13C:
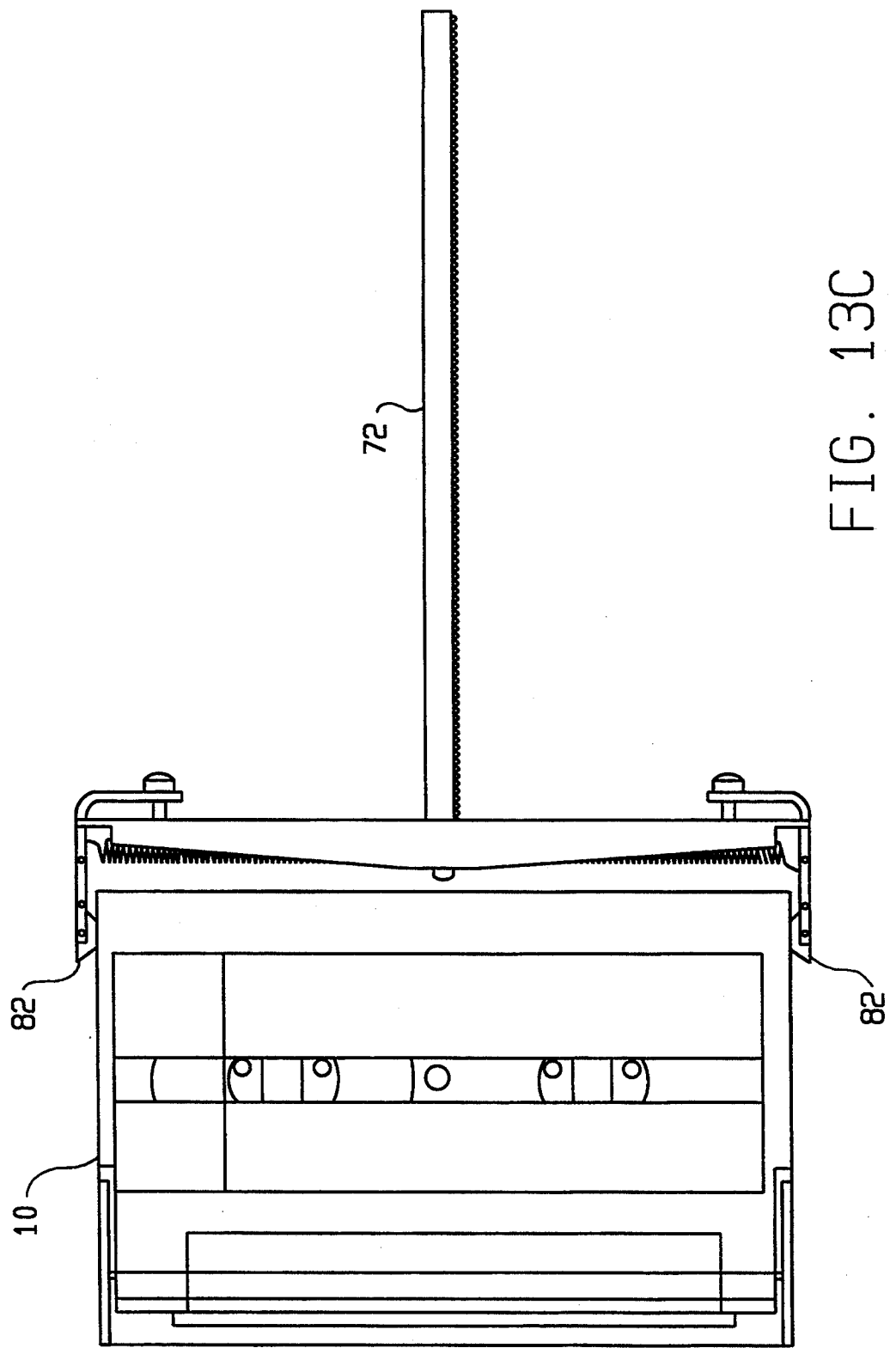

Operation of the manipulator 72 is shown in FIGS. 13A–C. In FIG. 13A, manipulator 72 is shown in contact with cartridge 10, as it would be aligned for pushing the cartridge out of the carousel from behind. Note that hooks 82 contact the back of the cartridge on the outer sloping surfaces of the hooks. The strength of the springs 84 and the slope of the outer surface of the hooks are chosen so that hinges 80 will not flex outward under the normal frictional resistance of a cartridge sliding on blocks 34, and so that spring retaining ends 58 will yield before the springs 84. Thus, the cartridge can be freed from retaining ends 58 and slide out of the blocks 34 under the force applied by manipulator 72, while the cartridge remains in contact with only the outer edges of hooks 82. Such a pushing operation would ordinarily be used, for example, to feed a cartridge to a tape drive for a reading or writing operation. The manipulator is driven a known distance, at which point the cartridge is grasped by the mounting mechanism of the tape drive, and the manipulator may be withdrawn.

To retrieve a cartridge from a tape drive and replace it in the carousel, the cartridge must be pulled inward toward the center of the carousel. This may be accomplished using the same manipulator. Once the tape drive has completed its dismounting operation and returned the tape to the vicinity of the carousel, the manipulator 72 is once again driven out to the same known distance as described before, so that the contact between the manipulator and the cartridge is once more as shown in FIG. 13A.

However, with the cartridge held by the tape drive to resist further pushing, the manipulator is driven still farther toward the cartridge. As shown in FIG. 13B, the resistance of the cartridge to pushing motion causes springs 84 to stretch, hinges 80 to flex outward, and hooks 82 to ride over the left and right sides of the cartridge at this transitional stage. As the manipulator continues to travel, hooks 82 find depressions 18 in the sides of the cartridge, and drop into them, as shown in FIG. 13C.

Figure 14A:
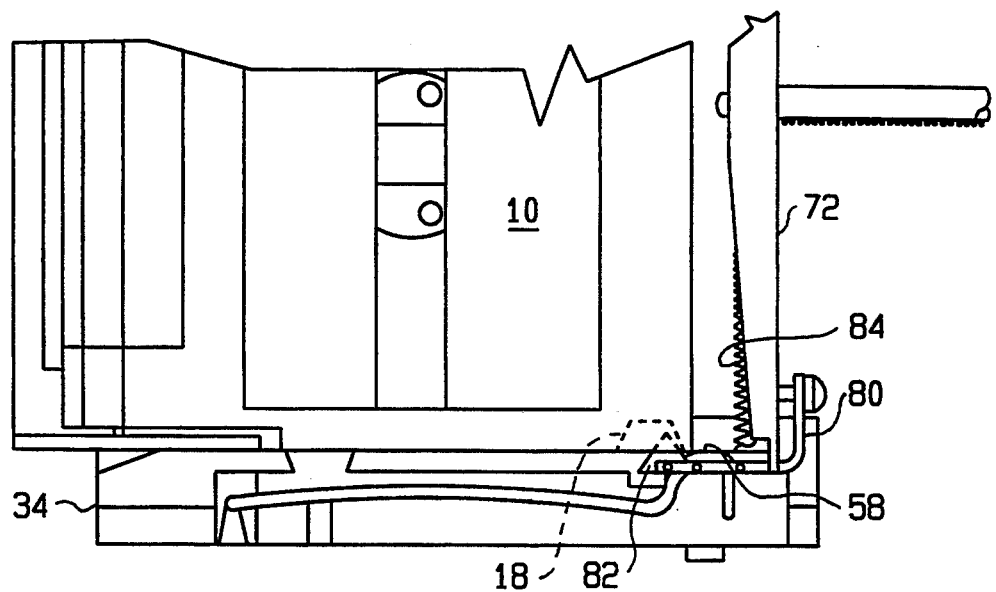
FIGS. 14A and 14B are side views of a cartridge, guide block, and manipulator, showing successive positions.
Figure 14B:
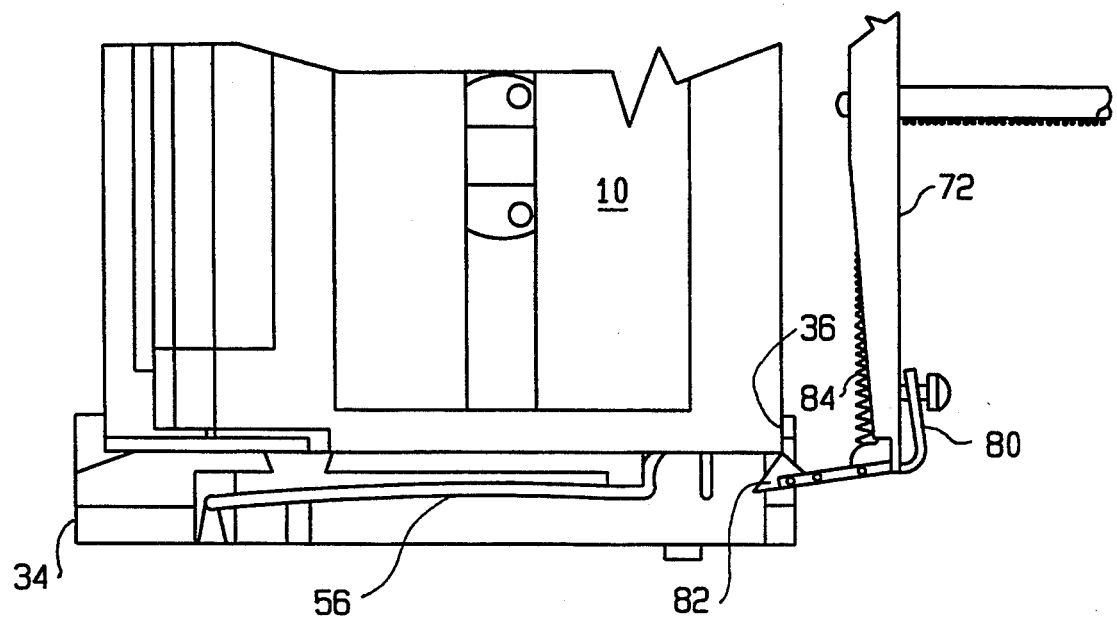

The cartridge is now gripped by the manipulator such that it can be pulled from the tape drive back into its proper chamber in the carousel. Interaction of the manipulator with the carousel structure is shown in FIGS. 14A and 14B. As the cartridge 10 is pulled toward the center of the carousel on block 34, hook 82 is engaged with depression 18. The relative strength of springs 84 and 56 and the slope of the inner face on hook 82 are chosen such that retaining end 58 is forced downward with the cartridge sliding over it, without flexing hinge 80.

As shown in FIG. 14B, when the cartridge 10 reaches stop 36, continued travel of manipulator 72 causes spring 84 to stretch, hinge 80 to flex, and hook 82 to leave depression 18. Meanwhile, retaining end 58 has flexed upward to reestablish its grip on the cartridge.

Figure 15:
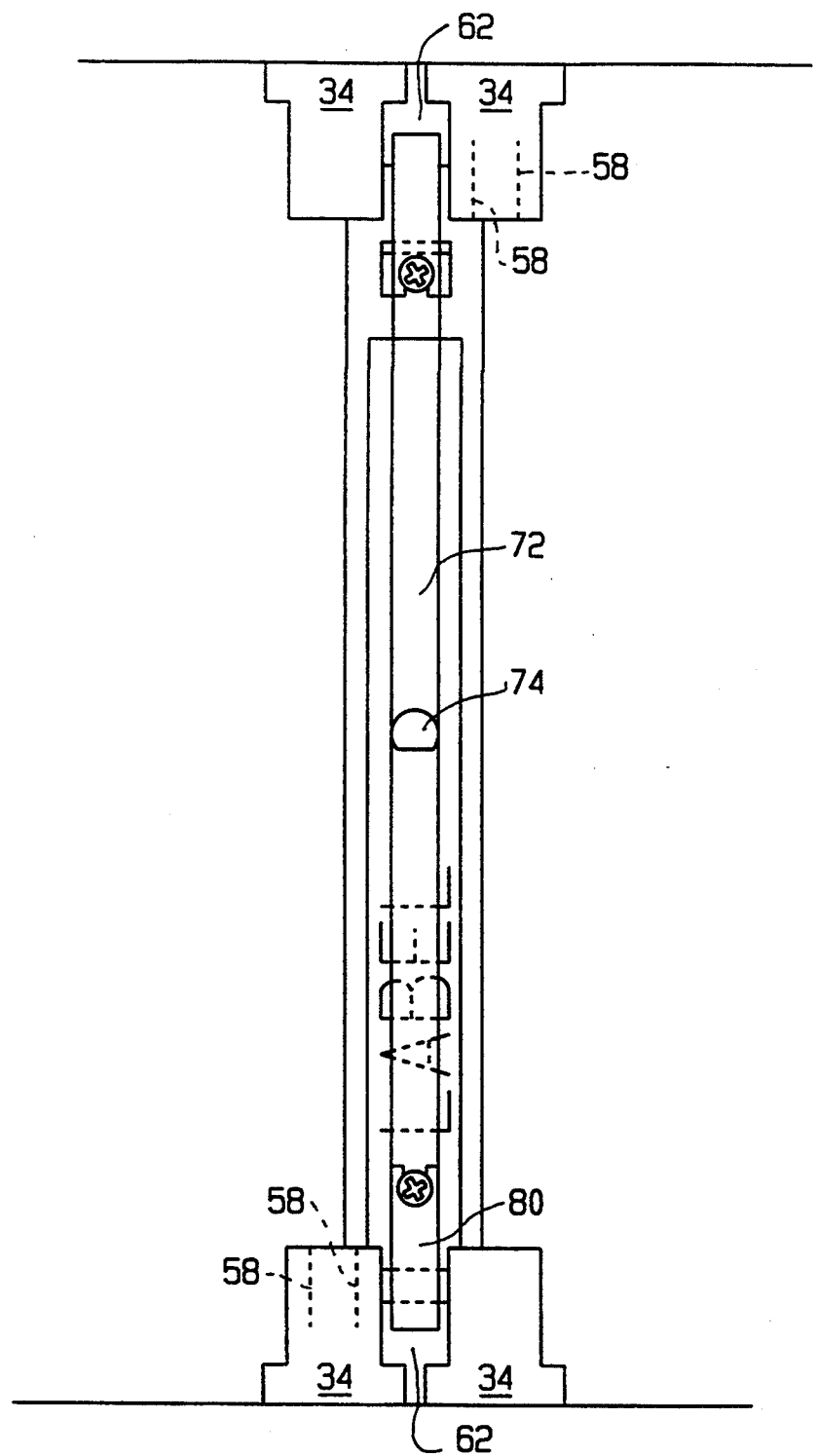
FIG. 15 is a view from inside a carousel along the shaft of a manipulator.

Hook 82 is sufficiently narrow that it will not interfere with retaining end 58 in depression 18. This geometry can be better appreciated by referring to FIG. 15, viewing the cartridge from behind, along the shaft 74 of the manipulator. Once again, as in FIG. 7, dotted lines are used to indicate the positions of retaining ends 58, otherwise not visible in this view. Note that the hinges and hooks of manipulator 72 fit within channels 62 between blocks 34. Furthermore, retaining ends 58 lie outside the width of hooks 82 on the manipulator, so that the engagement and disengagement of the retaining ends and the hooks with the cartridge are independent and non-interfering.

Figure 16:
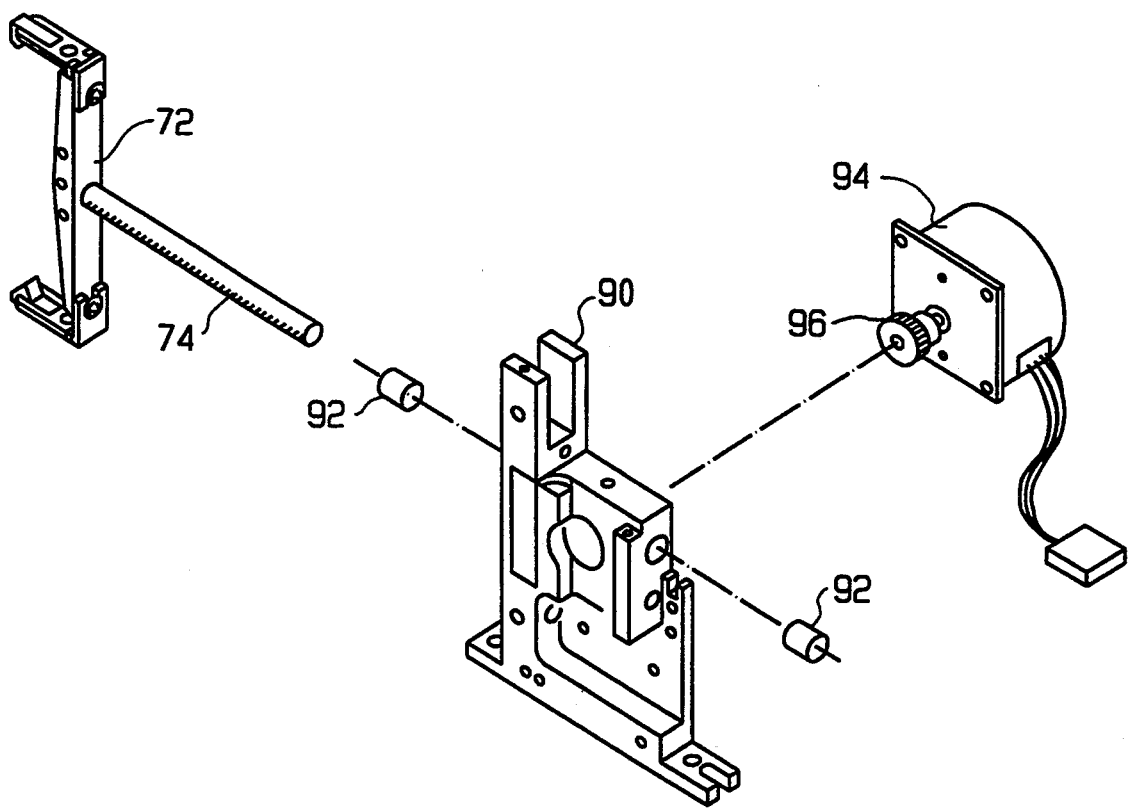
FIG. 16 is a perspective view of a manipulator and its drive system.

The drive mechanism for manipulator 72 is depicted in FIG. 16. Mounting fixture 90 and bushings 92 provide guidance for the shaft 74. As can be seen, fixture 90 also supports motor 94. A gear 96 on the motor forms a rack and pinion with the teeth cut into shaft 74. It has been found that no additional structure is necessary to constrain rotation of shaft 74 about its axis, permitting a simple system to be used. Motor 94 is preferably a stepper motor for precise control of the manipulator position. The mounting fixture 90 may be fitted with limit switches, particularly for detecting full retraction, for additional information on the manipulator position.

Figure 17:
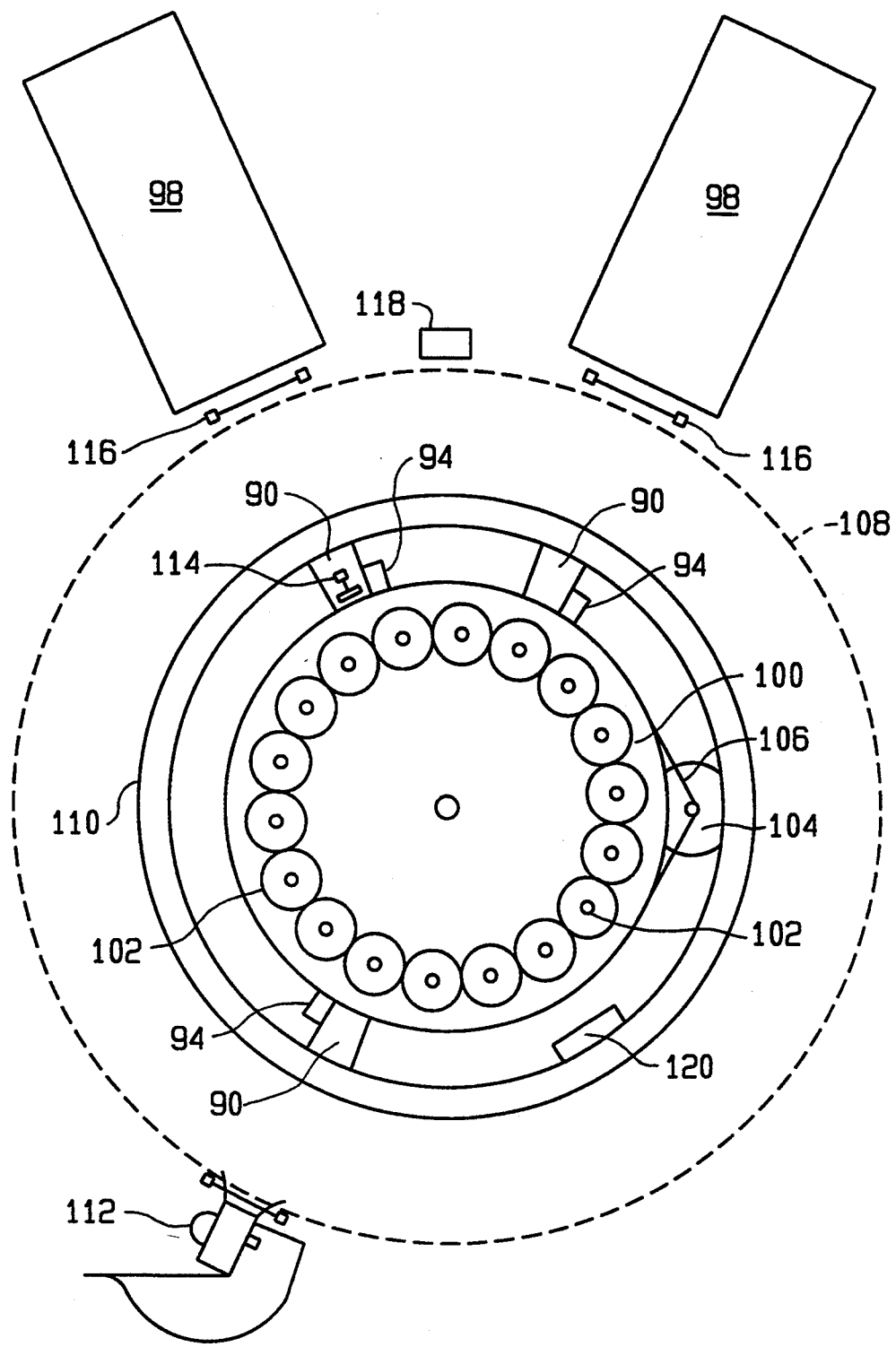
FIG. 17 is a diagram of a top view showing the relative placement of components of a cartridge library system, in which the carousel is not installed.

The positioning of the manipulator systems with respect to the other components of a library system can be understood by referring to FIG. 17.

In FIG. 17, a cartridge library system includes two tape drive units 98, as seen from above. In the preferred embodiment, these are conventional 8 mm tape drives such as those marketed by Exabyte Corporation of Boulder, Colo. Each drive is fitted with a small stepper motor (not shown) to power the tape drive tray for mounting and dismounting the cartridge after delivery from or prior to returning to the carousel. The motor is modified so that it can be rotated and clamped, so that the tray may be held firmly in position when specific motor phases are energized. This provides the ability to resist pushing motion by the manipulator, as described above.

An indexing plate 100 carries a set of holes 102 for receiving drive pins 64 of carousel 22. Eighteen such holes are provided in the preferred embodiment, and each has a large outer opening to assist in easily seating the carousel. Driving force for the carousel is provided by motor 104 acting through belt 106. Although no carousel is mounted in this view, a dotted line 108 has been included to show the approximate outer diameter of the carousel in the mounted position. A guide ring 110 aids in fitting the carousel in the proper position.

Three manipulator mounting fixtures 90 are visible, each with a motor 94. Two are aligned so that cartridges may be pushed toward and pulled from drives 98. The third is aligned with an express port 112, explained more fully below.

An optical sensor 114 is provided on one of the manipulator mounting fixtures, for detecting passage of openings in shutter plate 66. Additional optical sensors 116 are placed at the drives 98 to detect the presence of a cartridge.

A reflective sensor 118 is shown between the two drives. This sensor may be used to determine whether cartridges are properly loaded; improper loading will prevent a cartridge from being accepted by the tape drives. Since each properly loaded cartridge has a tapered cover 16 which faces outward from the carousel and to the left as viewed from above, rotation past the reflective sensor will produce a characteristic signal pattern. The sloping tapered surface will not reflect light back to the sensor as that edge of the cartridge passes, but the remainder of the front surface will so reflect. The sequence of reflections as a function of the rotational position of the carousel thus allows the system to confirm that cartridges have not been loaded with the wrong orientation.

A bar code reader 120 may also be included, positioned so that bar coded labels on the back of the cartridges will pass before it.

The configuration illustrated permits the entire library system to be constructed to fit within a standard rack width, while still permitting fifty-four cartridges to be carried within each carousel. The bidirectional manipulators are mounted on the interior of the carousel, while the tape drives are placed outside of it. Simple radial motion can be used for delivering tapes to the drives, and the drives are positioned where cooling air is easily circulated. In normal use, a set of shrouds and covers, not shown, is employed to protect the equipment and human operators from the dangers each presents to the other.

Figure 18:
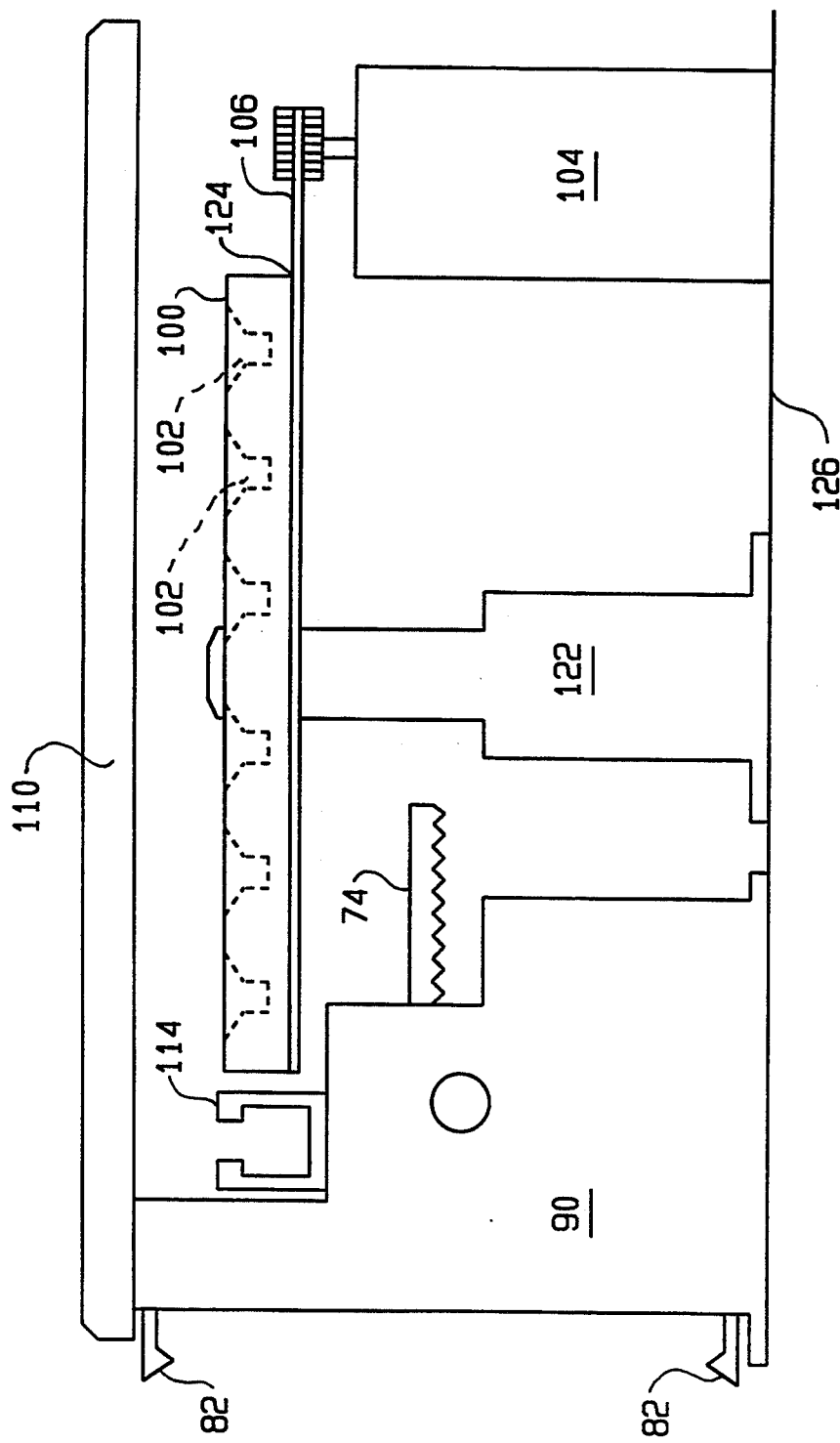
FIG. 18 is a side view of the carousel drive of a cartridge library system.

Referring now to FIG. 18, a side view of the carousel drive system reveals a spindle 122. Index plate 100 is mounted on the shaft protruding from the spindle. Holes 102 are represented with dotted lines, so that their interior contour can be appreciated as an aid to placement the drive pins of the carousel.

Index plate 100 is carried on a hub 124 having sprocket teeth. These teeth engage belt 106, which is preferably a positive drive zero-backlash molded polyurethane belt with steel cables, driven by motor 104. Index plate 100 is adjusted in assembly to have a known position with respect to baseplate 126 when specific phases of stepper motor 104 are energized, so that the angular position of the carousel relative to the baseplate is accurately established whenever a particular phase is energized.

One manipulator mounting fixture 90 is also visible in FIG. 18. At the top of fixture 90 is guide ring 110, and on another upper surface is optical sensor 114. A manipulator shaft 74 protrudes toward the spindle. The dimensions of the system are chosen so that sufficient outward travel of the manipulator can be had to deliver cartridges to tape drives, yet the fully retracted manipulator still fits completely within the inner radius of lower ring 24 of the carousel without running afoul of spindle 122. In this view, the manipulator is not shown fully retracted, but is positioned so that hooks 82 are just protruding to the left of the Figure, so that the reader may better visualize the relative placement of the components.

Figure 19A:
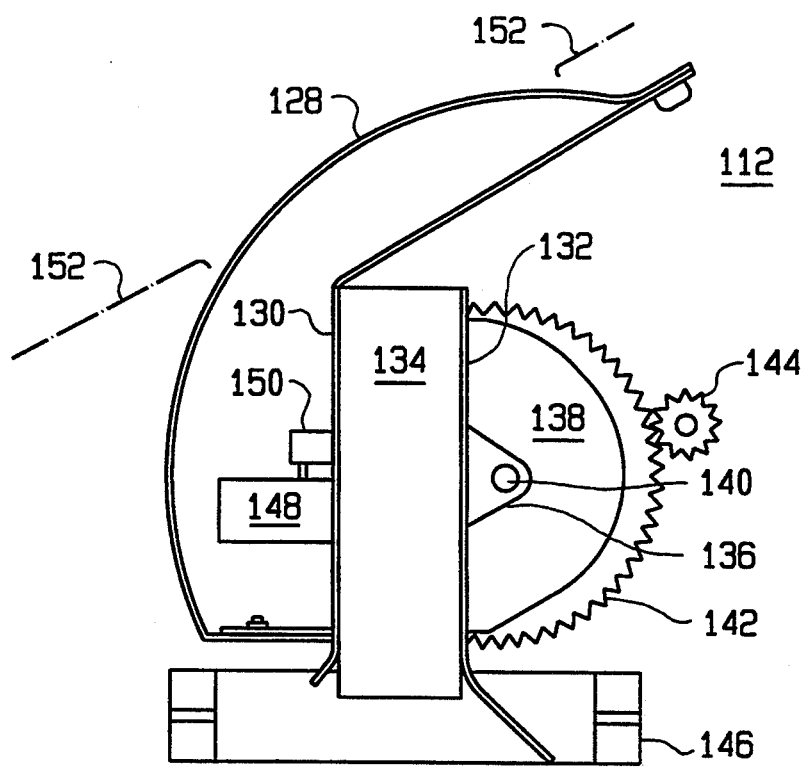
FIGS. 19A and 19B are top views of an express port in closed and open positions, respectively.
Figure 19B:
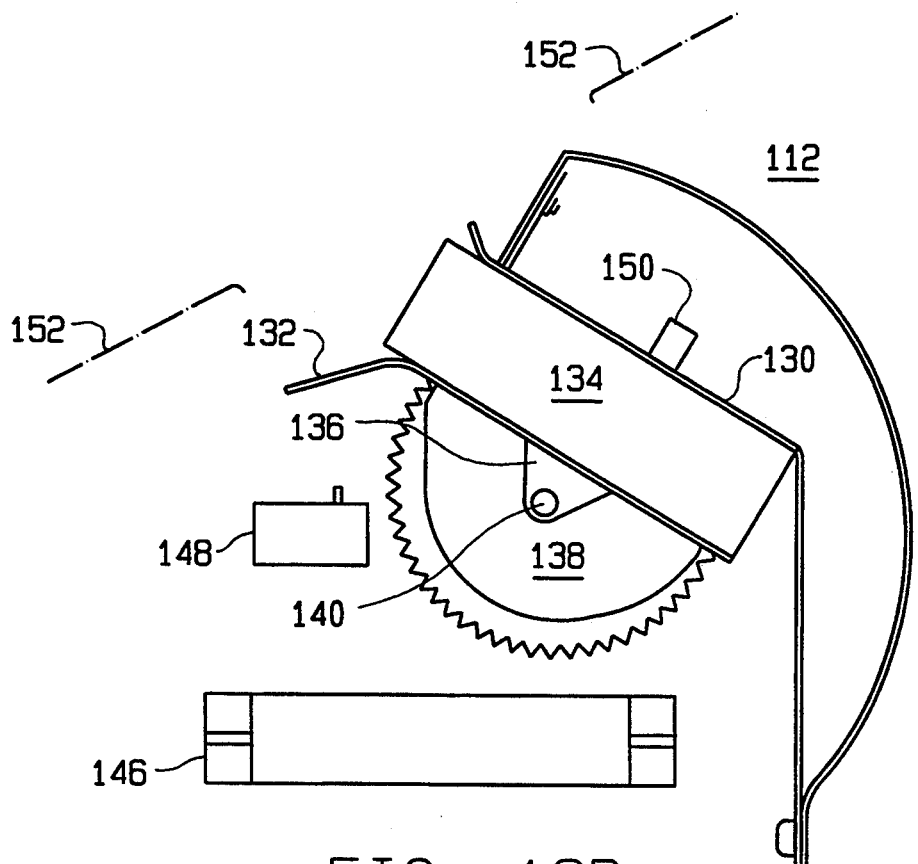

The express port 112 shown in FIG. 17 is shown in greater detail in FIGS. 19A and 19B. The express port permits loading and unloading of individual cartridges from the carousel without removal of the carousel from the library. In FIG. 19A, an express port 112 includes a semi-cylindrical door 128 and a cartridge chamber formed by side plates 130 and 132 and top plate 134; a bottom plate is provided but not visible in this view. Side plate 132 carries a top flange 136 and a bottom flange 138, which are fitted on to axle 140. Gear 142, when powered through gear 144, provides a rotational motion about axle 140.

An optical sensor 146 is placed to detect the presence of a cartridge in the opening of the chamber, through a cut-out in side plate 132 (not visible from above). A limit switch 148 is operated by tab 150 on side plate 130. Door 128 is attached to and rotates with side plate 130.

Lines 152 indicate the approximate position of the outer case of a library system. In the position shown in FIG. 19A, the door is closed between the interior and exterior of the library. However, as shown in FIG. 19B, rotation of the gear 142 moves the door so that an opening appears, and also rotates the chamber toward that opening for manual access from the outside of the library. In this position, gear 144 has been obscured by the passage of the cartridge chamber over it, and limit switch 148 is no longer in contact with tab 150.

Figure 20A:
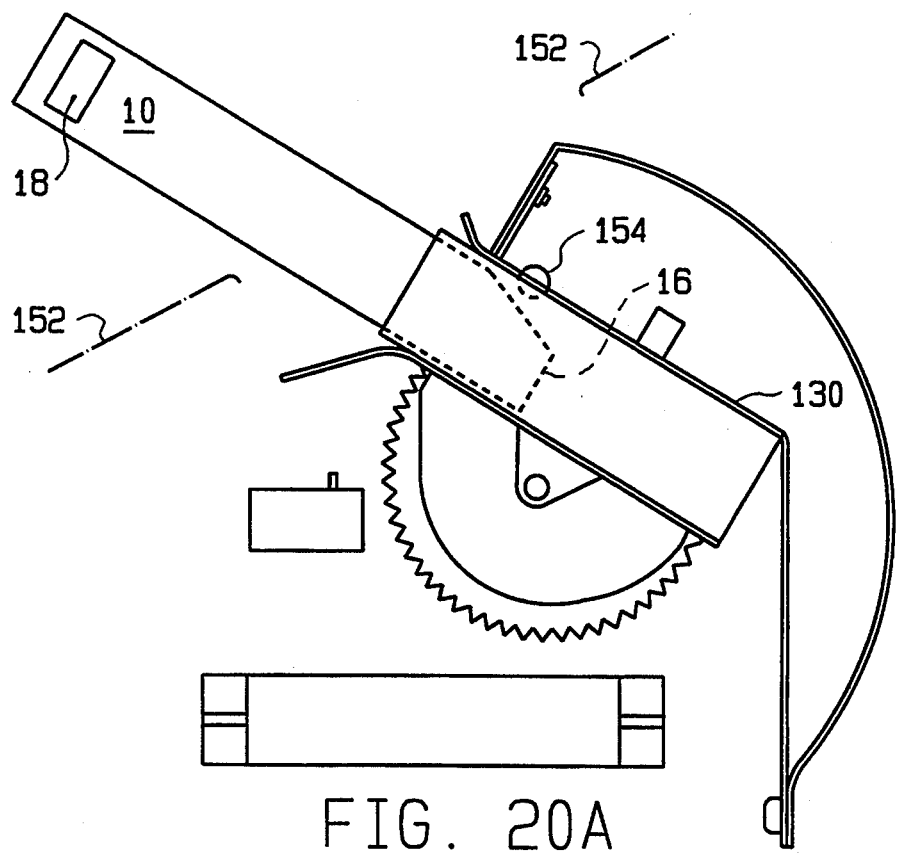
FIGS. 20A and 20B are top views showing two successive stages of manual insertion of a cartridge into the express port.
Figure 20B:
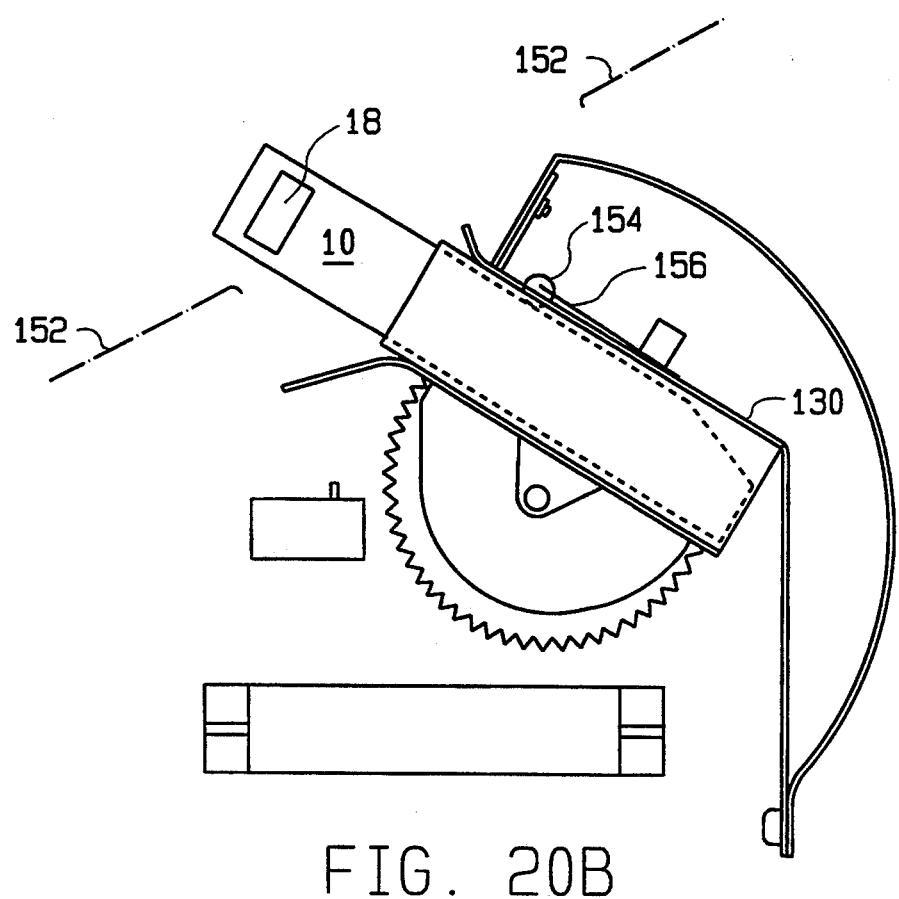

A cartridge may be removed from or loaded into the express port 112 from the outside by a human operator. A loading operation is illustrated in FIGS. 20A and 20B. In FIG. 20A, a cartridge 10 is being inserted into the chamber. From the position of depression 18 and front face cover 16, it can be seen that this cartridge is in the proper orientation. However, the express port is fitted with a device to prevent improper orientation.

A small roller 154 is resiliently attached to side plate 130 so that it protrudes through a gap into the cartridge chamber. If the cartridge is properly oriented, the tapered portion of cover 16 will encounter roller 154 and urge it outward. As seen in FIG. 20B, the cartridge has displaced roller 154 and has been placed fully into the chamber. A spring element 156 is just visible, due to the displacement of the roller. If the cartridge had been inserted in any other orientation, the roller 154 would have abutted against a flat, untapered surface, and would have blocked further motion inward. Roller 154 also operates to hold the cartridge in place during rotation of the express port.

Figure 21:
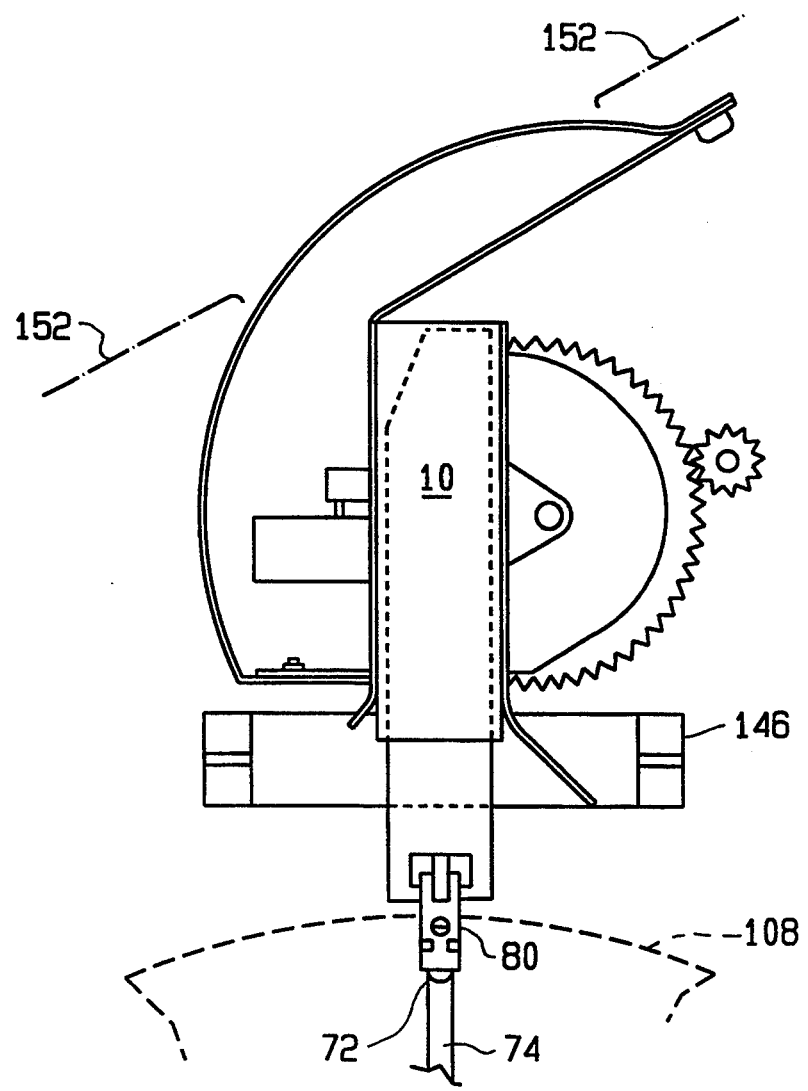
FIG. 21 is a top view of a cartridge in position for withdrawal from the express port into the carousel.

After the cartridge has been inserted into the express port, the port may rotate back to a closed position. As shown in FIG. 21, optical sensor 146 can then confirm the presence of a cartridge 10. A manipulator 72 can then withdraw the cartridge and place it appropriately within an empty place in the carousel. Here, shaft 74 and hinge 80 of the manipulator are shown as the manipulator drives forward to grip the cartridge. Motor torque through gears 142 and 144 resists rotation of the express port so that the hooks on the manipulator may spread through the transitional position to fall into place on the cartridge. Line 108 represents the approximate outer circumference of a carousel, into which manipulator 72 can then draw the cartridge 10.

The process may be reversed by using manipulator 72 to push the cartridge into the express port, followed by rotation to open the door for manual removal of the cartridge 10. In each case, the manipulator operates in the same manner as described above in the context of delivering cartridges to and removing them from the tape drives.

Figure 22:
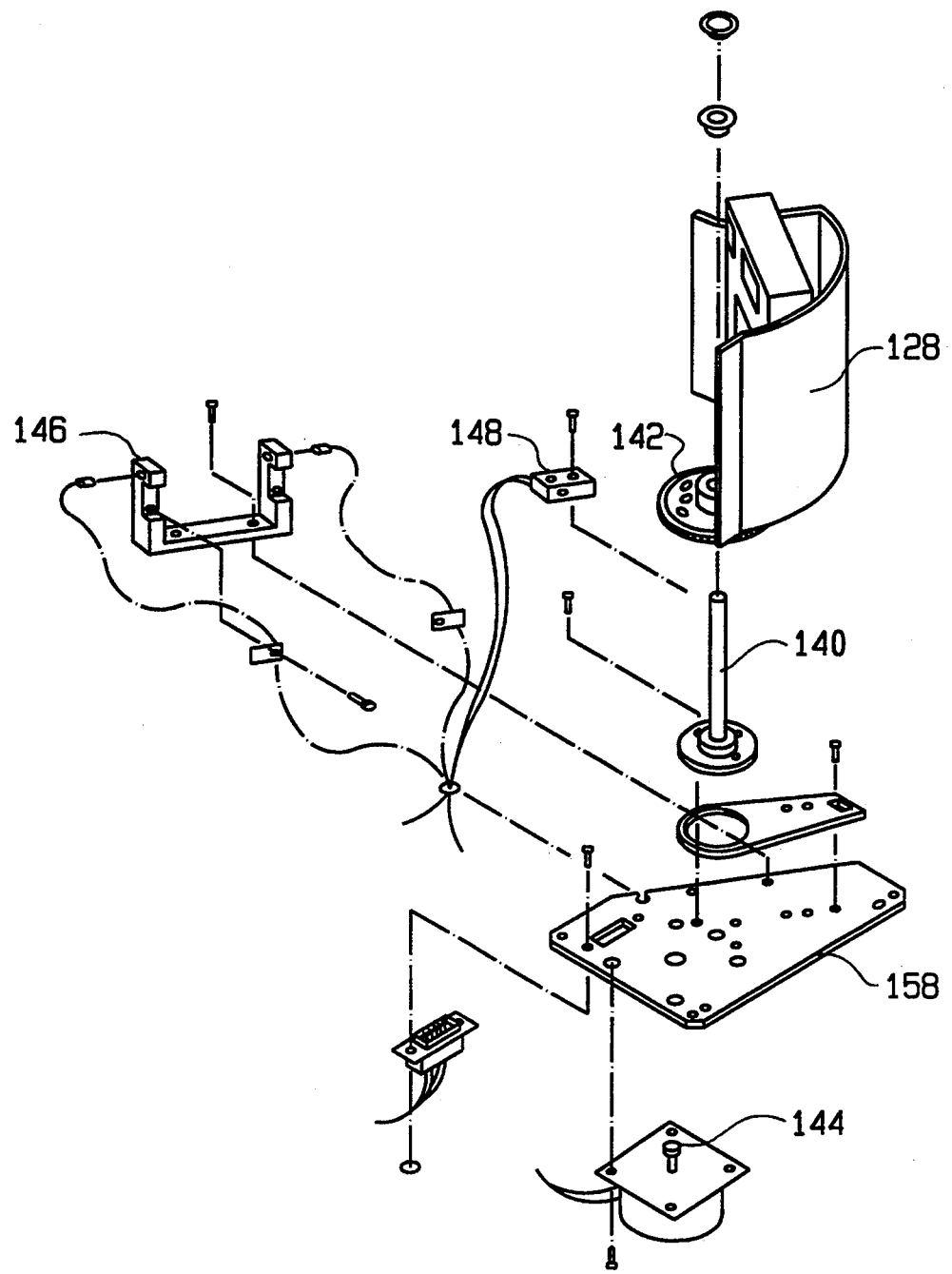
FIG. 22 is an exploded view of express port construction.
Figure 23:
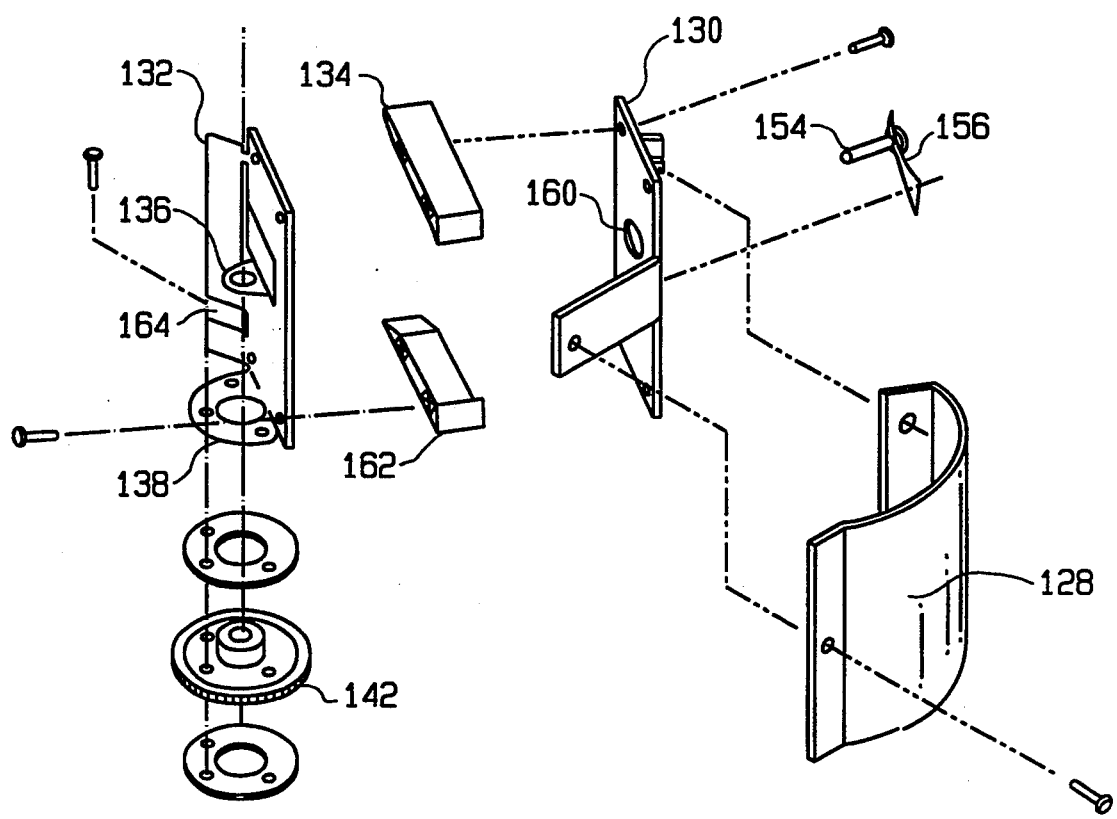
FIG. 23 is an exploded view showing further details of express port construction.

Details of the construction of the express port can be seen in FIG. 22. In this view, the side of axle 140 is visible, as is the face of door 128. The placement of gears 142 and 144, limit switch 148, and sensor 146 with respect to a base 158 are easily seen. Further details are provided in FIG. 23. Roller 154 and spring 156 are shown together with aperture 160 through which the roller protrudes. Top plate 134 is paired with a bottom plate 162, each of which has a ramp shape at one end and an edge to act as a stop at the other. These plates may be made of a low friction material, such as that used for blocks 34. Side plates 130 and 132, however, may be metal. In this view, cut-out 164, provided for the optical sensor 146, can be seen, and the positions of flanges 136 and 138 are also apparent.

It is anticipated that all operations of the library system will be under software control. Control of the various motors and interpretation of the signals from the sensors is handled by software so that proper timing of all necessary motions is achieved for indexing a newly loaded carousel, for determining whether cartridges are loaded in the proper orientation, for rotation of the carousel to access particular cartridges, for loading and unloading of cartridges from tape drives, for read and write operations on the cartridge tapes, and for operation of the express port, and for system operational checks using the shutter plate.

I claim:

1. An express port for manual loading and unloading of single data cartridges into and out of a carousel, the carousel being movable about a central axis within the outer case of an automatic library system, each of said data cartridges having a tapered edge along a front face, said data cartridges being carried in cartridge chambers in the carousel with the front face of each of said cartridges directed outward with respect to the central axis, comprising:

a rotatable chamber having an opening at one end, and being movable from a first preselected position to a second preselected position by rotation about an axle substantially parallel to the central axis of the carousel;

a door attached to the rotatable chamber and movable with the rotatable chamber; and a manipulator for drawing single cartridges out of the rotatable chamber and into the carousel and for pushing single cartridges out of the carousel and into the rotatable chamber;

the first position of the rotatable chamber being disposed to present the opening at one end of the rotatable chamber toward a cartridge chamber of the carousel, to enable the transfer of a cartridge between the carousel and the express port by the manipulator, while simultaneously placing the door in front of a gap in the outer case of the automatic library system, and the second position of the rotatable chamber being disposed to present the opening at one end of the rotatable chamber toward the gap in the outer case of the automatic library system, while simultaneously displacing the door away from the gap.

2. An express port as in claim 1, further comprising orientation restricting means for preventing insertion of a cartridge into the rotatable chamber in an improper orientation.

3. An express port as in claim 2, wherein the orientation restricting means comprises a roller resiliently biased into the rotatable chamber displaceable by contact with the tapered front edge of a cartridge.

4. An express port as in claim 1, further comprising an optical sensor for detecting the presence of a cartridge in the rotatable chamber.

5. An express port as in claim 4, wherein the optical sensor is placed to detect a cartridge when the rotatable chamber is in the first position.

6. An express port as in claim 1, in which the door is a segment of a cylinder.

7. An express port as in claim 1, in which the rotatable chamber includes ramps to guide a cartridge on insertion and stops to limit the displacement of the cartridge.

* * * * *